(12) United States Patent
Iijima et al.

(10) Patent No.: US 11,177,097 B2
(45) Date of Patent: Nov. 16, 2021

(54) GAS CIRCUIT BREAKER

(71) Applicants: KABUSHIKI KAISHA TOSHIBA, Tokyo (JP); Toshiba Energy Systems & Solutions Corporation, Kawasaki (JP)

(72) Inventors: Takanori Iijima, Yokohama Kanagawa (JP); Toshiyuki Uchii, Yokohama Kanagawa (JP); Amane Majima, Kawasaki Kanagawa (JP); Norimitsu Kato, Yokohama Kanagawa (JP); Akira Shimamura, Yokohama Kanagawa (JP)

(73) Assignees: KABUSHIKI KAISHA TOSHIBA, Tokyo (JP); TOSHIBA ENERGY SYSTEMS & SOLUTIONS CORPORATION, Kawasaki (JP)

( * ) Notice: Subject to any disclaimer, the term of this patent is extended or adjusted under 35 U.S.C. 154(b) by 0 days.

(21) Appl. No.: 16/768,648

(22) PCT Filed: Dec. 1, 2017

(86) PCT No.: PCT/JP2017/043342
§ 371 (c)(1),
(2) Date: May 30, 2020

(87) PCT Pub. No.: WO2019/106840
PCT Pub. Date: Jun. 6, 2019

(65) Prior Publication Data
US 2021/0175030 A1   Jun. 10, 2021

(51) Int. Cl.
*H01H 33/56* (2006.01)
*H01H 33/91* (2006.01)

(52) U.S. Cl.
CPC ............ *H01H 33/56* (2013.01); *H01H 33/91* (2013.01); *H01H 2033/566* (2013.01)

(58) Field of Classification Search
CPC ...... H01H 33/56; H01H 33/565; H01H 33/64; H01H 33/7023; H01H 33/7038;
(Continued)

(56) References Cited

U.S. PATENT DOCUMENTS 4,336,414 A * 6/1982 Suzuki .................. H01H 33/56
                                                  174/14 R
6,646,850 B1 * 11/2003 Bergmann ......... H01H 33/7015
                                                  218/53
(Continued)

FOREIGN PATENT DOCUMENTS

CN       101047077 A      10/2007
CN       104662634 A      5/2015
(Continued)

*Primary Examiner* — William A Bolton
(74) *Attorney, Agent, or Firm* — Finnegan, Henderson, Farabow, Garrett & Dunner L.L.P.

(57) ABSTRACT

A gas circuit breaker to reduce deterioration of insulation and current-breaking performance thereof includes a sealed container (8) filled with arc-extinguishing gas. A first fixed contactor portion (2) and a second fixed contactor portion (4) are fixed to the sealed container (8). A movable contactor portion (3) moves between the first fixed contactor portion (2) and the second fixed contactor portion (4) and conducts and breaks current between the first fixed contactor portion (2) and the second fixed contactor portion (4). An arc is generated between a fixed arc contactor (21) provided to the first fixed contactor portion (2) and a movable arc contactor (31) provided to the movable contactor portion (3) when current breaking action is extinguished by an arc-extinguishing gas being sprayed thereto. Unnecessary gas generated from the arc-extinguishing gas sprayed to the arc is accumulated in a gas chamber (5).

20 Claims, 18 Drawing Sheets

(58) Field of Classification Search
CPC ........... H01H 33/7053; H01H 33/7061; H01H 33/7084; H01H 33/7076; H01H 33/765; H01H 33/78; H01H 33/90; H01H 33/91; H01H 33/95; H01H 33/915; H01H 2033/566; H01H 2033/902; H01H 2033/912; H02B 13/045; H02B 13/055
USPC ........ 218/86, 53, 57, 59, 61, 63, 68, 79, 72, 218/80, 97, 107, 116
See application file for complete search history.

(56) References Cited

U.S. PATENT DOCUMENTS

| | | | | |
|---|---|---|---|---|
| 7,816,924 | B2* | 10/2010 | Kanazawa | ........... H01H 1/0015 324/415 |
| 8,389,886 | B2* | 3/2013 | Dahlquist | .............. H01H 33/74 218/59 |
| 8,674,253 | B2* | 3/2014 | Uchii | ..................... H01H 33/22 218/59 |
| 2007/0221626 | A1 | 9/2007 | Uchii | |
| 2014/0263187 | A1* | 9/2014 | Yamada | ............... H01H 33/905 218/63 |
| 2015/0194280 | A1 | 7/2015 | Uchii et al. | |

FOREIGN PATENT DOCUMENTS

| | | |
|---|---|---|
| CN | 106206155 A | 12/2016 |
| EP | 2 903 013 A1 | 8/2015 |
| JP | S59-198811 A | 11/1984 |
| JP | 62-44605 | 3/1987 |
| JP | H2-12038 A | 1/1990 |
| JP | H3-221880 A | 9/1991 |
| JP | H9-56024 A | 2/1997 |
| JP | 2001-169421 A | 6/2001 |
| JP | 2003-224907 A | 8/2003 |
| JP | 2007-258137 A | 10/2007 |
| JP | 2009-189182 A | 8/2009 |
| JP | 2014-72032 A | 4/2014 |
| JP | 2014-195344 A | 10/2014 |
| JP | 2015-73348 A | 4/2015 |
| JP | 2016-152648 A | 8/2016 |
| KR | 10-2007-0096925 A | 10/2007 |
| WO | WO 2014/050108 A1 | 4/2014 |

* cited by examiner

GAS CIRCUIT BREAKER

FIELD

The present disclosure relates to a gas circuit breaker that performs current breaking action in a power system.

BACKGROUND

Circuit breaker is used to break current flowing through power supply lines in power system. The gas circuit breaker is arranged in the power supply lines to break current that flows when cutting off a system in which accident has occurred at the time of system accident.

The gas circuit breaker has a pair of electrodes arranged oppositely in a sealed container in which arc-extinguishing gas is filled. This pair of electrodes is driven by driving device arranged outside the gas circuit breaker to open and close.

When the gas circuit breaker is opened, this pair of electrodes is driven by the driving device arranged outside the gas circuit breaker, and is mechanically cutoff. However, in gas circuit breaker installed in AC power system, arc current continues flowing until a current zero-point of next AC current even after the pair of electrodes is mechanically cutoff. Puffer-type gas circuit breaker circulates the arc-extinguishing gas in the sealed container, and sprays the arc-extinguishing gas to arc to break this arc current.

CITATION LIST

Patent Document

Patent Document 1: JP 2014-72032A
Patent Document 2: JP 2009-189182A
Patent Document 3: JP 2016-152648A

SUMMARY

Above described gas circuit breaker breaks arc current by spraying arc-extinguishing gas to the arc to extinguish the arc. Conventionally, as the arc-extinguishing gas, sulfur hexafluoride gas ($SF_6$ gas) having excellent arc-extinguishing performance was mainly used. However, sulfur hexafluoride gas ($SF_6$ gas) is a global warming gas, and recently, is demanded to reduce the usage amount thereof.

In recent years, instead of sulfur hexafluoride gas ($SF_6$ gas), arc-extinguishing gas mainly composed of carbon dioxide, which has little global warming potential, is used. Gas mixed to carbon dioxide is oxygen, fluorinated ether, and fluorinated ketone, etc. However, when the arc-extinguishing gas mainly composed of carbon dioxide is sprayed to the arc and becomes high temperature, it might produce unnecessary gas (hereinafter, referred to as unnecessary gas), such as ozone, carbon monoxide, etc. There is a problem that this unnecessary gas may deteriorate insulation performance and current breaking performance of the gas circuit breaker.

An objective of the present disclosure is to provide a gas circuit breaker that can reduce deterioration of insulation performance thereof and current breaking performance thereof by the unnecessary gas generated from the arc-extinguishing gas sprayed to the arc.

A gas circuit breaker of the present disclosure has following features.

(1) A sealed container which arc-extinguishing gas is filled in.

(2) A first fixed contactor portion which is fixed to the sealed container.

(3) A second fixed contactor portion which is fixed to the sealed container.

(4) A movable contactor portion which moves between the first contactor portion and the second contactor portion, and which conducts and breaks current between the first contactor portion and the second contactor portion.

(5) an arc generated between a fixed arc contactor provided to the first fixed contactor portion and a movable arc contactor provided to the movable contactor portion at a time of current breaking action is extinguished by the arc-extinguishing gas being sprayed thereto.

(6) A gas chamber to accumulate an unnecessary gas generated from the arc-extinguishing gas sprayed to the arc.

DETAILED DESCRIPTION

First Embodiment

1-1. Schematic Structure

Figure 1:
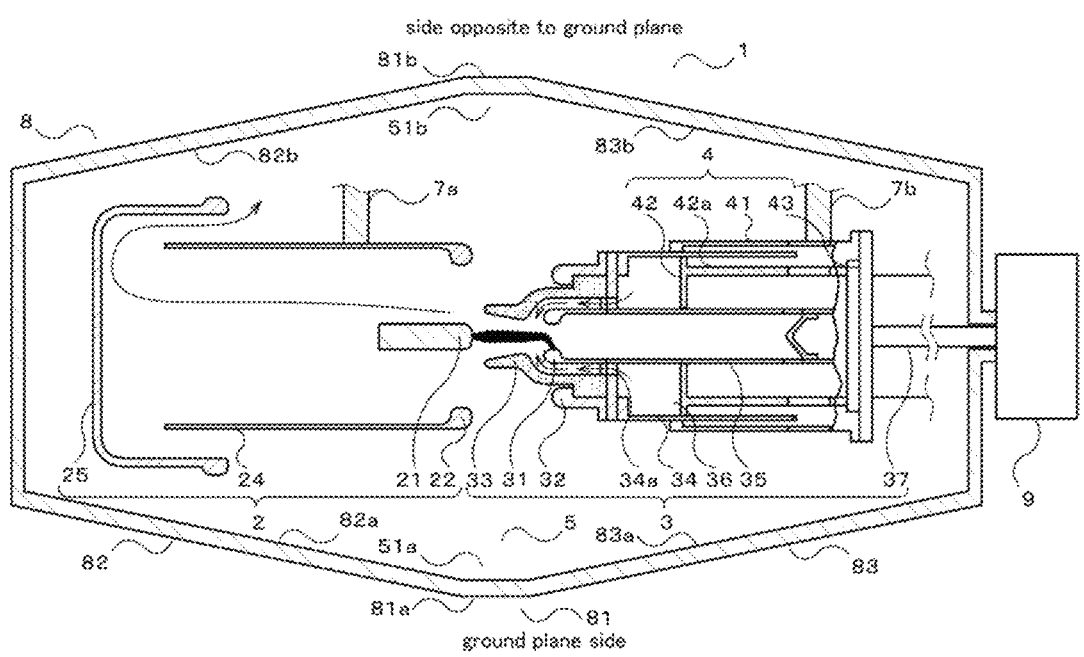
FIG. 1 is a diagram illustrating a structure of the gas circuit breaker according to the first embodiment.
Figure 2:
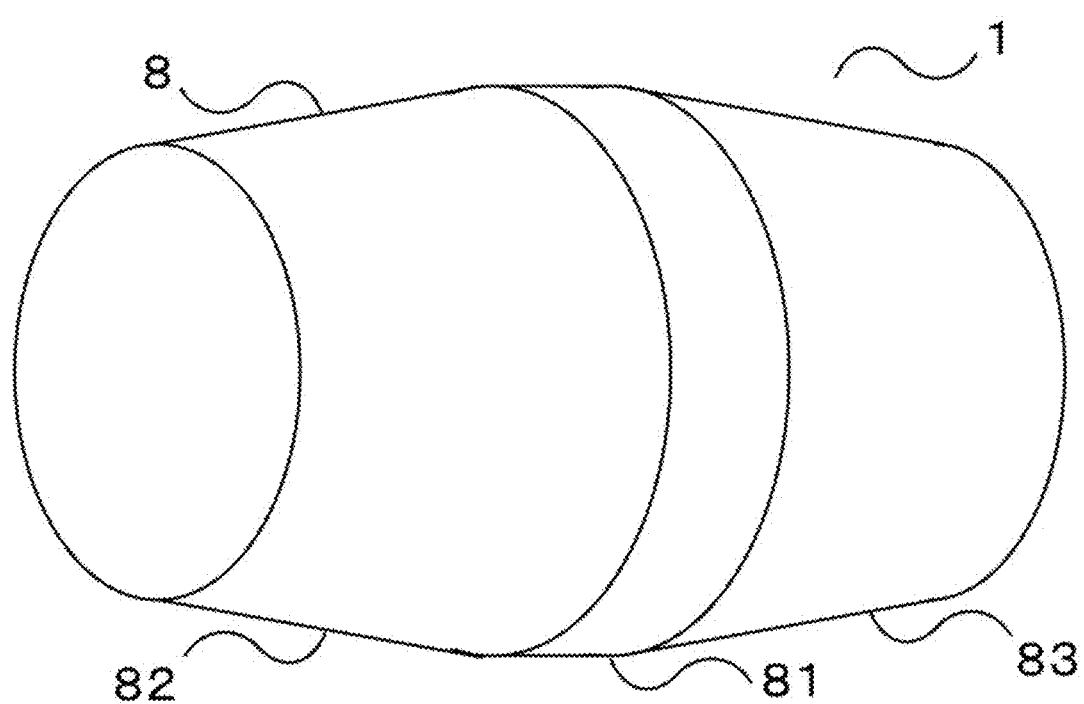
FIG. 2 is a perspective view illustrating an appearance of the gas circuit breaker according to the first embodiment.

Hereinafter, an entire structure of a gas circuit breaker according to the present embodiment is described with the reference to FIGS. 1 and 2. FIG. 1 illustrates a cross sectional view of the entire structure of the gas circuit breaker according to the present embodiment. FIG. 1 illustrates a inner structure of the gas circuit breaker in an open state.

A gas circuit breaker 1 includes a first fixed contactor portion 2 (hereinafter referred to as a fixed contactor portion 2), a movable contactor portion 3, a second fixed contactor portion 4 (hereinafter referred to as a fixed contactor portion 4), and a sealed container 8. A power supply line 7a is connected to the fixed contactor 2 via the sealed container 8, and a power supply line 7b is connected to the fixed contactor 4 via the sealed container 8. The power supply lines 7a and 7b is connected to a power system. The gas circuit breaker is installed in the power supply facilities, such as substations.

The fixed contactor portion 2 and the fixed contactor portion 4 are cylindrical member formed of conductive metal. The movable contactor portion 3 is a cylindrical member formed of conductive metal, and is arranged to be in close contact be slidable with inner diameter of the fixed contactor portion 2 and the fixed contactor portion 4. The fixed contactor 2 be slidable and the fixed contactor be slidable 4 are arranged to be separated from each other in the sealed container 8.

The movable contactor portion 3 is driven by a drive device 9 arranged outside the gas circuit breaker 1, and moves between the fixed contactor portion 2 and the fixed contactor portion 4 to electrically connect or disconnect the fixed contactor portion 2 and the fixed contactor portion 4. Accordingly, the power supply lines 7a and 7b are electrically connected or disconnected.

An arc is generated between the fixed contactor portion 2 and the movable contactor portion 3 when the gas circuit breaker becomes an opened-state. An arc-extinguishing gas filled in the sealed container 8 is circulated, and this arc is extinguished.

The sealed container 8 is a cylindrical sealed container made of metal or glass, etc., and the arc-extinguishing gas is filled therein. As the arc-extinguishing gas, gas mainly composed of carbon dioxide gas ($CO_2$ gas), which has excellent arc-extinguishing performance and insulation performance, is used. The sealed container 8 is connected to ground potential.

The fixed contactor portion 2 is a cylindrical member concentric with the sealed container 8. The fixed contactor portion 2 includes a fixed arc contactor 21, a fixed conductive contactor 22, and an exhaust cylinder 25. These components are described later. The power supply line 7a is connected to the fixed contactor portion 2 via the sealed container.

The fixed contactor portion 2 is provided and fixed to the sealed container 8. When the gas circuit breaker 1 becomes a closed-state, the fixed contactor portion 2 is electrically connected to the fixed contactor portion 4 via the movable contactor portion 3, and current are conducted between the power supply lines 7a and 7b. On the other hand, when the gas circuit breaker 1 becomes the opened-state, the fixed contactor portion 2 is electrically disconnected from the movable contactor portion 3, and current between the power supply lines 7a and 7b is broken.

The fixed contactor portion 4 is a cylindrical member concentric with the sealed container 8. The fixed contactor portion 2 includes a conductive contactor 41 and a piston 42. These components are described later. The power supply line 7b is connected to the fixed contactor 2 via the sealed container. The fixed contactor portion 4 is arranged and fixed to the sealed container 8.

When the gas circuit breaker 1 is in the closed-state, the fixed contactor portion 4 is electrically connected to the fixed contactor portion 2 via the movable contactor portion 3, and current are conducted between the power supply lines 7a and 7b. On the other hand, when the gas circuit breaker 1 is in the opened-state, the fixed contactor portion 4 is electrically disconnected from the movable contactor portion 3, and current between the power supply lines 7a and 7b is broken.

The movable contactor portion 3 is a cylindrical member concentric to the sealed container 8. The movable contactor portion 3 includes a movable arc contactor 31, a movable conductive contactor 32, an insulation nozzle 33, and a cylinder 34. These components are described later. One end of the movable contactor 3 is a cylindrical-shape having an outer diameter in contact with the inner diameter of the fixed contactor 2. The other end of the movable contactor 3 is a cylindrical-shape having an outer diameter in contact with the inner diameter of the fixed contactor portion 4. The movable contactor 3 is provided to be reciprocally movable between the fixed contactor 2 and the fixed contactor portion 4.

The movable contactor portion 3 is mechanically connected to the driving device arranged outside the gas circuit breaker 1. When opening and closing the gas circuit breaker 1, the movable contactor portion 3 is driven by the driving device 9, and the current flowing through the power supply lines 7a and 7b are conducted or broken. When the gas circuit breaker 1 becomes the closed-state, the movable contactor portion 3 is electrically connected with the fixed contactor portion 2 and the fixed contactor portion 4, so that the current is conducted between the power supply lines 7a and 7b. On the other hand, when the gas circuit breaker 1 becomes the opened-state, the movable contactor portion 3 is electrically disconnected from the fixed contactor portion 2, and the current between the power supply lines 7a and 7b is broken.

Furthermore, when the gas circuit breaker 1 is in the opened-state, the movable contactor portion 3 raises the pressure of the arc-extinguishing gas in an accumulation chamber 26 formed by the piston 42 and the cylinder 34 that works together with the movable contactor portion 3. When the gas circuit breaker 1 is in the opened-state, the movable contactor portion 3 makes the arc-extinguishing gas accumulated in the accumulation chamber 36 to blowout from the insulation nozzle 33, and the arc generated between the fixed contactor portion 2 and the movable contactor portion 3 is extinguished, and arc current is broken The fixed contactor portion 2, the movable contactor portion 3, the fixed contactor portion 4, and the sealed container 8 are concentric cylindrical members having a common center axis, and are arranged on the same axis. In below, to describe positional relation and direction of each member, a direction toward the fixed contactor portion 2 side is called an open-end direction, and a direction toward the fixed contactor portion 3 side opposite thereto is called driving-device direction The sealed container 8 is a cylindrical sealed container made of metal or glass, etc., and the arc-extinguishing gas is filled therein. The sealed container 8 is formed by joining ends of two hollow truncated cone portions 82 and 83 having the large diameter, with cylindrical portion 81 therebetween. The sealed container 8 includes air chambers 51*a* and 51*b* inside the cylindrical portion 81 to which two truncated cone portions 82 and 83 are joined. The air chambers 51*a* and 51*b* accumulate the unnecessary gas generated from the arc-extinguishing gas sprayed to the arc.

1-2. Detailed Structure (Fixed Contactor Portion 2)

The fixed contactor portion 2 includes the fixed arc contactor 21 and the fixed conductive contactor 22.

The fixed conductive contactor 22 is a ring-shape electrode arranged on an end surface of the outer circumference of the fixed contactor portion 2 in the driving-device direction. The fixed conductive contactor 22 is formed of a metal conductor formed into a ring shape bulging toward the inner diameter side by shaving, etc.

The fixed conductive contactor 22 has the inner diameter which is slidable and which has a constant clearance, relative to the outer diameter of the movable conductive contactor 32 of the movable contactor portion 3. The fixed conductive contactor 22 is arranged at an end of a ventilation cylinder 24, which is formed of cylindrical conductive metal, in the driving-device direction. The ventilation cylinder 24 is connected to the power supply line 7*a* via the sealed container 8. The ventilation cylinder 24 is fixed to the sealed container by an insulation member.

When the gas circuit breaker 1 is in the closed-state, the movable conductive contactor 32 of the movable contactor portion 3 is inserted into the fixed conductive contactor 22. Accordingly, the fixed conductive contactor 22 contacts with the movable conductive contactor 32, and electrically connects the fixed contactor portion 2 and the movable contactor portion 3.

On the other hand, when the circuit breaker 1 is in the opened-state, the fixed conductive contactor 22 is physically separated from the movable conductive contactor 32 of the movable contactor portion 3, and electrically disconnects the fixed contactor portion 2 and the movable contactor portion 3.

(Fixed Arc Contactor 21)

The fixed arc contactor 21 is a bar-shape electrode arranged at the end of the fixed contactor portion 2 in the driving-device direction along a center axis of the cylinder of the fixed contactor portion 2. The fixed arc contactor 21 is formed of solid cylindrical conductive metal having a hemisphere end at the driving-device direction side formed by shaving, etc.

The fixed arc contactor 21 has an outer diameter which is slidable and which has a constant clearance, relative to the inner diameter of the movable arc contactor 31 of the movable contactor portion 3. The fixed arc contactor 21 is fixed to the ventilation cylinder 24 by a fixation support provided in an inner surface of the ventilation cylinder 24 forming the outer circumference of the fixed contactor portion 2.

When the gas circuit breaker 1 is in the closed-state, the fixed arc contactor 21 is inserted into the movable arc contactor 31 of the movable contactor 3. Accordingly, the fixed arc contactor 21 contacts with the movable arc contactor 31 of the movable contactor 3, and electrically connects the fixed contactor portion 2 and the movable contactor portion 3.

On the other hand, when the gas circuit breaker 1 is in the opened-state, the fixed arc contactor 21 is separated from the movable arc contactor 31 of the movable contactor 3, and bears an arc generated between the fixed contactor portion 2 and the movable contactor portion 3. The arc is not generated between the fixed conductive contactor 22 and the movable conductive contactor 32 of the movable contactor portion 3.

The fixed arc contactor 21 and the movable arc contactor 31 are provided to avoid the generation of arc between the fixed conductive contactor 22 and the movable conductive contactor 32, and to concentrate the arc between the fixed arc contactor 21 and the movable arc contactor 31. Accordingly, the deterioration of the fixed conductive contactor 22 and the movable conductive contactor 32 by the arc can be suppressed.

Note that the arc between the fixed arc contactor 21 and the movable arc contactor 31 is extinguished by spraying the gas-extinguishing gas accumulated in the accumulation chamber 36 formed by the piston 42 and the cylinder 34 of the movable contactor portion 3 via the insulation nozzle 33.

(Ventilation Cylinder 24)

The ventilation cylinder 24 is a cylindrical member formed of shaved conductive metal. The ventilation cylinder 24 has the cylindrical axis thereof aligned with the axis of the fixed conductive contactor 22, and is arranged on the end of the fixed conductive contactor 22 in the open-end direction. The ventilation cylinder 24 may be formed integrally with the fixed conductive contactor 24.

The diameter of the ventilation cylinder is substantially equal to the outer diameter of the fixed conductive contactor 22. The ventilation cylinder 24 is connected to the power supply line 7*a* via the sealed container 8.

The ventilation cylinder 24 supports the fixed arc contactor 21, the fixed conductive contactor 22, and the exhaust pipe 25. An interior of the ventilation cylinder 24 is a flow path for the arc-extinguishing gas, and guides the arc-extinguishing gas that has been sprayed to the arc and become high temperature from an arc space between the fixed arc contactor 21 and the movable arc contactor 31 to the exhaust pipe 25. A space between the fixed arc contactor 21 and the movable arc contactor 31 where the arc is generated is called the arc space.

(Exhaust Pipe 25)

The exhaust pipe 25 is a cylindrical member which is formed of conductive metal and which has a bottom on one end and an opening on the other end. The diameter of the opening of the exhaust pipe 25 is larger than the diameter of the end of the ventilation cylinder 24 on the open-end direction. The exhaust pipe 25 is fixed to the fixed contactor portion 2 by a support (not illustrated), etc., such that the bottom thereof is in the open-end direction and the opening thereof is in the driving-device direction. The exhaust pipe 25 is arranged such that the opening of the exhaust pipe 25 covers the end of the ventilation cylinder 24 in the open-end direction.

A flow path for exhausting the arc-extinguishing gas is formed between the opening of the exhaust pipe 25 and the end of the ventilation cylinder 24. A flow of the arc-extinguishing gas to be exhausted is changed to the driving-device direction by the exhaust pipe 25, and is exhausted to the sealed container by the ventilation cylinder 24.

(Fixed Contactor Portion 4)

The fixed contactor portion 4 includes the conductive contactor 41 and the piston 42.

(Conductive contactor 41)

The conductive contactor 41 is a ring-shape electrode arranged on end surface of the outer circumference of the fixed contactor portion 4 in the open-end direction. The conductive contactor 41 is formed of conductive metal formed into a ring-shape bulging toward the inner diameter side by shaving, etc.

The conductive contactor 41 has an inner diameter which is slidable and which has a constant clearance, relative to an outer diameter of the cylinder 34 of the movable contactor portion 3. The fixed conductor contactor 41 is arranged to an end of the support 43, which is formed of cylindrical conductive metal, in the open-end direction. The support 43 is connected to the power supply line 7vb via the sealed container 8. The support 43 is fixed to the sealed container 8 by insulation material.

When the gas circuit breaker 1 is in the closed-state or in the opened-state, the cylinder 34 of the movable contactor portion 3 is inserted into the conductive contactor 41. Accordingly, the conductive contactor 41 contacts with the cylinder 34, and connects the fixed contactor portion 4 and the movable contactor portion 3. The cylinder 34 of the movable contactor portion 3 slides inside the conductive contactor 41. Since the cylinder 34 of the movable contactor portion 3 is formed of conductive metal, electrical connection between the fixed contactor portion 4 and the movable contactor portion 3 is ensured regardless of whether the gas circuit breaker 1 is in the closed-state or in the opened-state.

(Piston 42)

The piston 42 is a plate in a torus-shape arranged on the end of the fixed contactor portion in the open-end direction. The piston 42 is formed of conductive metal formed into torus-shape by shaving, etc.

The piston 42 has an outer diameter slidable with the outer diameter of the cylinder 34 of the movable contactor portion 3. The diameter of a torus-shape hole of the piston 42 is slidable with an outer diameter of an operation rod 35 forming an inner wall of the cylinder 34 of the movable contactor portion 3.

The piston 42 is fixed to the support 43 by piston support 42a provided on an inner wall surface of the support 43 forming the outer circumference of the fixed contactor portion.

The piston 42 forms the accumulation chamber 36 for accumulating the arc-extinguishing gas together with the cylinder 34 of the movable contactor portion 3. When the gas circuit breaker 1 becomes the opened-state, the piston 42 compresses the arc-extinguishing gas in the accumulation chamber together with the cylinder 34 of the movable contactor portion 3. The piston 42 ensures airtightness of the accumulation chamber 36. Accordingly, the arc-extinguishing gas in the accumulation chamber 36 is pressurized.

The arc between the fixed conductive contactor 22 and the movable conductive contactor 32 is extinguished by spraying the arc-extinguishing gas pressurized in the accumulation chamber 36 via the insulation nozzle 33.

(Support 43)

The support 43 is a cylindrical conductor having a bottom on an end in the driving-device direction. The cylinder 34 of the movable contactor portion 3 is inserted into the support 43 from the open-end direction.

(Movable Contactor Portion 3)

The movable contactor portion 3 includes the movable arc contactor 31, the movable conductive contactor 32, the insulation nozzle 33, and the cylinder 34.

(Movable Conductive Contactor 32)

The movable conductive contactor 32 is a ring-shape electrode arranged on an end surface of the outer circumference of the movable contactor portion 3 in the open-end direction. The movable conductive contactor 32 is formed of a metal conductor formed into a ring-shape by shaving, etc.

The movable conductive contactor 32 has the outer diameter which is slidable and which has a constant clearance, relative to the inner diameter of the fixed conductive contactor 22 of the fixed contactor portion 2. The movable conductive contactor 32 is arranged on the end of the cylinder 34, which is formed of cylindrical conductive metal, in the open-end direction.

When the gas circuit breaker 1 is in the closed-state, the movable conductive contactor 32 is inserted into the fixed conductive contactor 22 of the fixed contactor portion 2. Accordingly, the movable conductive contactor 32 contacts with the fixed conductive contactor 22, and electrically connects the fixed contactor portion 2 and the movable contactor portion 3.

On the other hand, when the circuit breaker 1 is in the opened-state, the movable conductive contactor 32 is separated from the fixed conductive contactor 22 of the fixed contactor portion 2, and electrically disconnects the fixed contactor portion 2 and the movable contactor portion 3.

The movable conductive contactor 32 is formed integrally with the cylinder 34 formed of conductor. When the gas circuit breaker 1 is in the closed-state or in the opened-state, the cylinder 34 is inserted into and contacted with the conductive contactor 41 of the fixed contactor portion 4, and connects the fixed contactor portion 4 and the movable contactor portion 3. Since the cylinder 34 slides inside the conductive contactor 41 of the fixed contactor portion, electrical connection between the fixed contactor portion 4 and the movable contactor portion 3 is ensured regardless of whether the gas circuit breaker 1 is in the closed-state or in the opened-state.

(Movable Arc Contactor 31)

The movable arc contactor 31 is a cylindrical electrode arranged on the end of the movable contactor portion 3 in the open-end direction along the center axis of the cylinder of the movable contactor portion 3. The movable arc contactor 31 is formed of conductive metal formed into a hollow cylinder having one end rounded.

The movable arc contactor 31 has the inner diameter which is slidable and which has a constant clearance, relative to the outer diameter of the fixed arc contactor 21 of the fixed contactor portion 2. The movable arc contactor 31 is connected to the inner circumference of the cylinder 34 of the movable contactor portion 3. The movable arc contactor 31 is driven by driving device 9 via the cylinder 34 and the insulation nozzle 37, and reciprocates between the fixed contactor portion 2 and the fixed contactor portion 4.

When the gas circuit breaker 1 is in the closed-state, the fixed arc contactor 21 of the fixed contactor portion 2 is inserted into the movable arc contactor 31. Accordingly, the movable arc contactor 31 contacts with the fixed arc contactor 21 of the fixed contactor portion 2, and electrically connects the fixed contactor portion 2 and the movable contactor portion 3.

On the other hand, when the gas circuit breaker 1 is in the opened-state, the movable arc contactor 31 is separated from the fixed arc contactor 21 of the fixed contactor portion 2.

Accordingly, the movable arc contactor 31 bears the arc generated between the movable contactor portion 3 and the fixed contactor portion 3. The arc is not generated between the movable conductive contactor 32 and the fixed conductive contactor 22 of the fixed contactor portion.

The arc generated when the gas circuit breaker 1 is in the opened-state concentrates between the movable arc contactor 31 and the fixed arc contactor 21. The generation of the arc between the movable conductive contactor 32 and the fixed conductive contactor 22 is avoided, and the deterioration of the movable conductive contactor 32 and the fixed conductive contactor 22 can be suppressed. Note that the arc between the movable arc contactor 31 and the fixed arc contactor 21 is extinguished by spraying the gas-extinguishing gas accumulated in the accumulation chamber 36 formed by the piston 42 and the cylinder 34 of the movable contactor portion 3.

The opening of the inner space of the movable arc contactor 31 on one end communicates with the space between the movable arc contactor 31 and the fixed arc contactor 21 where the arc is generated. The inner space of the movable arc contactor 31 is one of the flow paths for the arc-extinguishing gas when extinguishing the arc.

The driving device 9 drives and moves the movable arc contactor 31 via the operation rod 35 fixedly supported toby the movable arc contactor 31. The operation end 35 is a cylinder having an opening on one end in the open-end direction, a bottom on the other end in the driving-device direction, and a hollow interior. The operation rod 35 is arranged on a cylinder having same diameter as that of the movable arc contactor 31.

(Cylinder 34)

The cylinder 34 is a cylindrical member which is formed conductive metal and which has a bottom on one end and an opening on the other end. The cylinder 34 includes the operation rod 35 forming a cylindrical inner wall. The operation rod 35 is a cylindrical member arranged concentric with the cylinder 34.

The cylinder 34 is connected to and moves with the operation rod 35, such that the bottom of the cylinder 34 is in the same plane as the end surface of the operation rod 35 in the open-end direction. The inner diameter of the cylinder 34 is larger than the outer diameter of the operation rod 35, and the cylinder 34 and the operation rod 35 have the common center axis. The bottom of the cylinder 34 is in a disc-shape and expands in a flange-shape from the outer circumferential edge of the tip of the operation rod 35, and a side wall of the cylinder 34 extends in the driving-device direction. The end surface of the support 43 of the fixed contactor portion 4 in the driving-device direction is opened, and the operation rod 35 is inserted into this opening and penetrates inside the support 43.

The cylinder 34 has the outer diameter which is slidable and which has a constant clearance, relative to the inner diameter of the conductive contactor 41.

The cylinder 34 has the inner diameter which is slidable with the outer diameter of the piston 42 of the fixed contactor portion 4. Furthermore, the operation rod 35 forming the inner wall of the cylinder 34 has the outer diameter slidable with the hole diameter of the torus-shape piston 42.

The cylinder 34 is arranged between the fixed contactor portion 2 and the fixed contactor portion 4 such that the bottom thereof is in the open-end direction and the opening thereof is in the driving-device direction. The cylinder 34 is arranged to be slidable with the conductive contactor 41 of the fixed contactor portion 4.

Furthermore, the piston 42 is inserted into the cylinder 34, and the cylinder 34 and the piston 42 forms the accumulation chamber 36 for accumulating the arc-extinguishing gas. When the gas circuit breaker 1 becomes the opened-state, the cylinder 34 and the piston 42 compress the arc-extinguishing gas in the accumulation chamber 36. The cylinder 34 and the piston 42 ensure airtightness of the accumulation chamber 36. Accordingly, the arc-extinguishing gas in the accumulation chamber 36 is pressurized.

A through hole 34a is provided in the surface of the cylinder 34 in the open-end direction. The arc-extinguishing gas pressurized in the accumulation chamber 36 is guided to the arc space via the 4 insulation nozzle 33.

The cylinder 34 is driven by the driving device 9 via the insulation nozzle 37 connected to the operation rod 35, and reciprocates. The reciprocation by the driving device 9 is performed when the gas circuit breaker 1 becomes the closed-state or the opened-state.

When the gas circuit breaker 1 is in the closed-state or in the opened-state, the cylinder 34 is inserted into the conductive contactor 41 of the fixed contactor portion 4. Accordingly, the cylinder 34 contacts with the conductive contactor 41, and electrically connects the movable contactor portion 3 and the fixed contactor portion 4. The cylinder 34 slides inside the conductive contactor 41. Since the cylinder 34 is formed of conductive metal, electrical connection between the movable contactor portion 3 and the fixed contactor portion is ensured regardless of whether the gas circuit breaker 1 is in the closed-state or in the opened-state.

When the gas circuit breaker 1 becomes the opened-state, the cylinder 34 is driven via the operation rod 35 and the insulation rod 37, and moves in the driving-device direction. Accordingly, the cylinder 34 compresses the arc-extinguishing gas in the accumulation chamber 36 in cooperation with the piston 42. As a result, the arc-extinguishing gas in the accumulation chamber 36 is pressurized.

Note that a communication hole communicating the hollow portion of the operation rod 35 and the inner space of the support 43 is provided in the circumference wall of the operation rod 35, and in addition, an exhaust hole communicating the inner space of the support 43 and the outer space thereof is provided in the side wall of the support 43. Therefore, the hollow portion of the operation rod 35, the inner space of the support 43, and the interior of the sealed container 8 are communicated, and form one of the flow paths for the gas from the arc space.

(Insulation Nozzle 33)

The insulation nozzle 33 is a cylindrical rectifying member having a throat portion to guide a blowout direction of the arc-extinguishing gas pressurized in the accumulation chamber 36. The insulation nozzle 33 is formed of heat-resistant insulator, such as polytetrafluoroethylene, etc.

The insulation nozzle 33 is arranged such that the axis of the cylinder forming the insulation nozzle 33 comes to the end of the cylinder in the open-end direction on the extension of the axis of the cylinder 34.

The insulation nozzle 33 extends along the axis toward the fixed arc contactor 21 side, and when the insulation nozzle 33 extends beyond the tip of the movable arc contactor 31, the inner diameter thereof narrows to a level slightly larger than the outer diameter of the fixed arc contactor 21, and when the insulation nozzle 33 reaches the throat portion where the inner diameter thereof is the smallest, the inner diameter thereof expands linearly in the open-end direction.

The arc-extinguishing gas is guided to the arc space by the insulation nozzle 33. Furthermore, by the throat portion of the insulation nozzle 33, the flow speed of the arc-extinguishing gas gets faster, while the arc-extinguishing gas is concentrated to the arc space.

When the gas circuit breaker 1 becomes the opened-state, the arc-extinguishing gas is compressed and pressurized in the accumulation chamber 36 formed by the cylinder 34 and the piston 42. The arc-extinguishing gas pressurized in the accumulation chamber 36 passes through the penetration hole 34a of the cylinder 34, and is guided to the arc space via the interior of the insulation nozzle 33. As a result, the arc-extinguishing gas is sprayed to the arc generated between the movable arc contactor 21 and the fixed arc contactor 21, and the arc is extinguished.

When the gas circuit breaker 1 becomes the opened-state, the arc-extinguishing gas pressurized in the accumulation chamber 36 sequentially passes through the penetration hole 34a provided on the end surface of the cylinder 34 in the open-end direction, the inner circumferential space of the movable arc contactor 31 inside the insulation nozzle 33, the arc space, the inner space of the insulation nozzle 33 in the open-end direction, the ventilation cylinder 24, and is exhausted into the sealed container 8. These spaces in series become one of the exhaustion flow paths for the arc-extinguishing gas.

Since the insulation nozzle 33 continues to be exposed to the arc with extremely high temperature by the generation of the arc, the material of the insulation nozzle 33, such as insulator like polytetrafluoroethylene, etc., melts and is gasified. As a result, this gas of molten insulator enters into the accumulation chamber 36 from the inner wall of the insulation nozzle 33, and affects the pressurization in the accumulation chamber 36.

(Sealed Container)

The sealed container 8 is a cylindrical sealed container formed of metal or glass, etc., and the arc-extinguishing gas is filled therein. The sealed container 8 is formed by joining ends of two hollow truncated cone portions 82 and 83 having large diameter, via cylindrical portion 81 therebetween. The sealed container 8 includes a truncated cone portion 82 having tapered portion 82a and 82b, and a truncated cone portion 83 having tapered portion 83a and 83b. The truncated cone portions 82 and 83 are joined via the cylindrical portion 81. The sealed container 8 includes air chambers 51a and 51b inside the cylindrical portion 81 to which two truncated cone portions 82 and 83 are joined.

The sealed container 8 has the cylindrical portion 81 at the portion where the two truncated cone portions 82 and 83 are joined, and the cylindrical portion 81 has a flat portion 81a at the ground plane side and a flat portion 81b at the side opposite to ground plane. The air chamber 51a for accumulating unnecessary gas with the specific gravity heavier than the arc-extinguishing gas, such as ozone, is arranged inside the flat portion 81a of the cylindrical portion 81 at the ground plane side, and the air chamber 51b for accumulating unnecessary gas with the specific gravity lighter than the arc-extinguishing gas, such as carbon monoxide, is arranged inside the flat portion 81b of the cylindrical portion 81 at the side opposite to ground plane.

The interior of the sealed container is filled with the arc extinguishing gas which is mainly composed of carbon dioxide ($CO_2$ gas). The arc extinguishing gas is equal to or more than 0.1 MPa-g, and preferably includes equal to or more than 50% of carbon dioxide.

The arc is generated between the fixed contactor portion 2 and the movable contactor portion 3 when the gas circuit breaker becomes the opened-state. This arc is extinguished by spraying the arc-extinguishing gas filled in the sealed container 8. The arc-extinguishing gas sprayed to the arc generates unnecessary gas, such as ozone and carbon monoxide, etc.

The sealed container 8 includes air chambers 51a and 51b for accumulating the unnecessary gas generated from the arc-extinguishing gas sprayed to the arc. Note that the air chambers 51 and 51 b may be collectively referred to as the air chamber 5.

(Air Chamber)

The air chamber 5 is formed by the air chamber 51a and the air chamber 51b. The air chambers 51a and 51b are formed of the same materials as the sealed container 8. The air chambers 51a and 51b accumulate the unnecessary gas generated from the arc-extinguishing gas sprayed to the arc.

The sealed container 8 has a shape in which the ends of the two hollow truncated cone portion 82 and 83 are joined via the cylindrical portion 81. The portion of the two truncated cone portion 82 and 83 having large opening diameter is joined to the cylindrical portion 81, and this cylindrical portion 81 forms the flat portions 81a and 81b. The flat portion 81a is formed at the ground plane side, and the flat portion 81b is formed at the side opposite to ground plane.

The air chambers 51a and 51b are portions provided inside the flat portions 81a and 81b of the cylindrical portion 81, respectively. The cylindrical portion 81 having the flat portions 81a and 82b in which the air chambers 51a and 51b, and two truncated cone portions 82 and 83 are integrally formed and ensures airtightness of the arc-extinguishing gas filled in the sealed container 8. The air chambers 51a and 51b accumulate the unnecessary gas generated from the arc-extinguishing gas sprayed to the arc.

The air chamber 51a is a portion provided inside the flat portion 81a of the cylindrical portion 81 in the ground plane side. The air chamber 51a arranged in the ground plane side of the sealed container 8 accumulates the unnecessary gas with the specific gravity heavier than the arc-extinguishing gas, such as ozone. It is preferable that the volume of the air chamber 51a is equal to or more than 0.01% of the volume of the sealed container 8.

The air chamber 51b is a portion provided inside the flat portion 81a of the cylindrical portion 81 in the side opposite to ground plane. The air chamber 51b arranged in the side opposite to ground plane of the sealed container 8 accumulates the unnecessary gas with the specific gravity lighter than the arc-extinguishing gas, such as carbon monoxide. It is preferable that the volume of the air chamber 51b is equal to or more than 0.01% of the volume of the sealed container 8.

It is preferable that the air chambers 51a and 51b are arranged in the sealed container 8 which is on the line from the arc space that is the arc generation space perpendicular to the ground plane and which is between the fixed arc contactor 21 and the movable arc contactor 31.

1-2. Action

Next, the action of the gas circuit breaker according to the present embodiment will be explained based on FIGS. 1 and 2.

(A. When the Gas Circuit Breaker 1 is in the Closed-State)

Firstly, a case when the gas circuit breaker 1 according to the present embodiment is in the closed-state will be explained. When the gas circuit breaker 1 is in the closed-state, current flows through the power supply lines 7a and 7b.

When the gas circuit breaker 1 is in the closed-state, the fixed contactor portion 2 and the fixed contactor portion 4 are electrically connected via the movable contactor portion, and current flows between the power supply lines 7a and 7b. In detail, the movable conductive contactor 32 of the movable contactor portion 3 is inserted into the fixed conductive contactor 22 of the fixed contactor portion 2. Accordingly, the fixed conductive contactor 22 contacts with the movable conductive contactor 32, and the fixed contactor portion 2 and the movable contactor portion 3 becomes electrically conductive state.

Furthermore, the fixed arc contactor 21 of the fixed contactor portion 2 is inserted into the movable arc contactor 31 of the movable contactor portion 3. Accordingly, the fixed arc contactor 21 contacts with the movable arc contactor 31, and the fixed contactor portion 2 and the movable contactor portion 3 becomes electrically conductive state.

In addition, the cylinder 24 of the movable contactor portion 3 is inserted into the conductive contactor 41 of the conductive contactor 41. Accordingly, the conductive contactor 41 contacts with the cylinder 43, and the fixed contactor portion 4 and the movable contactor portion 3 becomes electrically conductive state.

Moreover, the cylinder 34, the movable conductive contactor 32, and the movable arc contactor 31 of the movable contactor portion 3 are electrically connected. As a result, the fixed contactor portion 2 and the fixed contactor portion 4 are electrically connected via the movable contactor portion 3, and the power supply lines 7a and 7b become electrically conductive state.

In such state, the arc is not yet generated in the space between the movable arc contactor 31 and the fixed arc contactor 21. Also, the arc-extinguishing gas has uniform pressure at all portions in the sealed container 8. Therefore, the arc-extinguishing gas in the accumulation chamber 36 formed by the cylinder 34 of the movable contactor portion 3 and the piston 42 of the fixed contactor portion 4 is not pressurized.

When the gas circuit breaker is in the closed-state, the pressure of the arc-extinguishing gas in the sealed container 8 is uniform, and the temperature of the arc-extinguishing gas is at normal temperature. Therefore, the unnecessary gas, such as ozone and carbon monoxide, etc., which are generated when the arc-extinguishing gas are at high temperature are not be generated.

(B. When the Gas Circuit Breaker 1 is in the Opened-State)

Next, a case when the gas circuit breaker 1 according to the present embodiment is in the opened-state will be explained. When the gas circuit breaker 1 becomes the opened-state, current flowing through the power supply lines 7a and 7b is broken.

The current breaking action, in which the gas circuit breaker 1 is made to be the opened-state, is performed when switching the gas circuit breaker 1 from the conductive state to the broken state, such as when breaking a delayed load current like fault current, leading small current, and reactor breaking action, or when breaking extremely small fault current.

When the gas circuit breaker 1 is switched from the closed-state to the opened-state, the driving device 9 is driven. The driving device 9 moves the movable contactor portion 3 in the fixed contactor portion 4 along the axis in the driving-device direction. Accordingly, the movable arc contactor 31 is separated from the fixed arc contactor 21, while the movable conductive contactor 32 is separated from the fixed conductive contactor 22.

As a result, the arc is generated in the arc space between the fixed arc contactor 21 and the movable arc contactor 31. Since this arc has very high temperature, high temperature gas is generated from the arc, and the arc-extinguishing gas around the arc is heated to become high temperature.

Along with the movement of the movable contactor portion 3, the cylinder 34 moves in the driving-device direction to become close to the piston 42. Accordingly, The accumulation chamber 36 formed by the cylinder 34 and the piston 42 is compressed, and the arc-extinguishing gas in the accumulation chamber 36 is pressurized. Furthermore, when the movable contactor portion 3 is moved by the driving device 9 and the pressure of the arc-extinguishing gas in the accumulation chamber is pressurized to become the preset pressure, the arc-extinguishing gas is made to blowout from the through hole 34a of the accumulation chamber 36.

At current zero-point of AC supplied from the power supply lines 7a and 7b, the arc between the fixed arc contactor 21 and the movable arc contactor 31 becomes small, and is extinguished by spraying the arc extinguishing gas. As a result, the gas circuit breaker 1 becomes the opened-state, and the current flowing through the power supply lines 7a and 7b is broken.

Conventionally, as the arc-extinguishing gas, sulfur hexafluoride gas ($SF_6$ gas) having excellent arc-extinguishing performance was mainly used. However, sulfur hexafluoride gas ($SF_6$ gas) is a global warming gas, and recently, is demanded to reduce the usage amount thereof.

As replacement for sulfur hexafluoride gas ($SF_6$ gas), mixed gas mainly composed of carbon dioxide is used. Gas mixed to carbon dioxide is oxygen, fluorinated ether, and fluorinated ketone, etc. In below, the case of using the arc extinguishing gas in which oxygen is mixed to carbon dioxide ($CO_2$ gas) will be explained.

The interior of the sealed container is filled with the arc extinguishing gas in which oxygen is mixed to carbon dioxide ($CO_2$ gas). The arc-extinguishing gas is equal to or more than 0.1 MPa-g, and preferably includes equal to or more than 50% of carbon dioxide.

The arc is generated between the fixed contactor portion 2 and the movable contactor portion 3 when the gas circuit breaker becomes the opened-state. This arc is extinguished by spraying the arc-extinguishing gas filled in the sealed container 8. The arc-extinguishing gas sprayed to the arc generates unnecessary gas, such as ozone and carbon monoxide, etc.

Between the fixed arc contactor 21 and the movable arc contactor 31 becomes so-called arc-plasma state by the arc generated at the time of current breaking action. The arc-extinguishing gas in the arc-plasma state becomes high temperature and high pressure and reacts to generate the unnecessary gas.

The arc-extinguishing gas in which oxygen ($O_2$) is mixed to carbon dioxide ($CO_2$ gas) is sprayed to the arc, and causes the reaction indicated below.

A. Initial Reaction

  (Reaction 1)

$$CO_2 + e^- \rightarrow CO + O + e^-$$

  (Reaction 2)

$$O_2 + e^- \rightarrow O + O$$

B. Intermediate Reaction

  (Reaction 3)

$$CO_2 + O \rightarrow CO + O_2$$

  (Reaction 4)

$$O_2 + O \rightarrow O_3$$

C. Termination Reaction

CO+O→CO$_2$  (Reaction 5)

O$_3$+O+M→O$_2$+O$_2$+M  (Reaction 6)

O$_3$+thermal→O$_2$+O  (Reaction 7)

O+O→O$_2$  (Reaction 8)

In the above reactions, each sign represents the following.
O: oxygen atom
e$^-$: electron
CO: carbon monoxide
O$_3$: ozone
M: predefined particles (particle types are not specified)

Furthermore, the reaction speed Rf of each reaction can be represented by the following formula.

$Rf = kf*[A]*[B]$  (Formula 1)

In the above formula, each sign represents the following.
Kf: reaction speed constant
[A]: particle density of the particle A for reaction
[B]: particle density of the particle B for reaction In addition, the reaction speed constant kf can be represented by the following formula.

Reaction speed constant $kf = A*\exp(-Ea/kBT)$  (Formula 2)

In the above formula, each sign represents the following.
A: constant for frequency factor of
Ea: activation energy
kB: Boltzmann constant
T: temperature Note that above formula is applied in the case of two body collision as an example.

$CO_2$ and $O_2$ in the above are in stable state. In contrast, $O_3$ spontaneously dissociate within 24 hours and returns to $O_2$, for example, by the above reaction 6 when in the normal temperature and atmospheric pressure.

As indicated in formula 1, the reaction speed depends on the particle density. For example, regarding CO and O indicated in reaction 3, if CO exists but O atom which react with CO does not exist, the reaction does not proceed, and CO continues to exist as it is.

Table 1 indicates the actual measured values of remaining ratio of each particle at certain time after the current breaking test is performed with $CO_2$ as the arc-extinguishing gas.

TABLE 1

| Existence Ratio (Actual Measurement) of CO and O$_3$ after Current is broken when the Arc-Extinguishing Medium is CO$_2$ | | | |
|---|---|---|---|
| CO | O$_3$ | H$_2$O | HF |
| 0.01% | 0.01% | 0.01% | 0.1% |

By the experiment by the inventors, $O_3$ is generated even when the gas in which oxygen ($O_2$) is mixed to carbon dioxide ($CO_2$ gas) is used. In table 1, very small amount of $H_2O$ is contaminated unintentionally. Hydrogen fluoride HF generated by dissociation and recombination of $H_2O$ in the arc-plasma state is also detected.

The present embodiment is directed to the mixed gas including 50% or more of carbon dioxide ($CO_2$ gas). Since the mixed gas is sufficiently mixed beforehand, the mixed gas is uniformly distributed and the density distribution is not produced in the sealed container 8. When the plasma state is generated in certain place in the sealed container 8, the density distribution of the mixed gas according to molecular weight is transitionally produced by the reaction indicated in reactions 1 to 8.

Afterward, dispersion by natural convection and concentration distribution occurs, and the concentration distribution in the sealed container 8 including the unnecessary gas is uniformed. Once uniformed concentration distribution is irreversible based on the law of entropy increase, and the concentration distribution will not be ununiformed again.

Therefore, if the unnecessary gas is not captured before the concentration distribution is uniformed, the unnecessary gas keep existing in the sealed container 8 for a long time. Table 2 indicates the molecular weight of relatively stable particles generated by the reactions 1 to 8 in the arc-plasma state.

TABLE 2

| Molecular Weight | Molecular Weight |
|---|---|
| CO | 28 |
| CO$_2$ | 44 |
| O$_3$ | 48 |

In the transitional state after the occurrence if the arc-plasma state in the sealed container 8, particles with large molecular weight is precipitated in the bottom of the sealed container, that is, at the ground plane side, and particles with light weight is rises to the upper portion of the sealed container 8, that is, at the side opposite to ground plane. In the present embodiment, ozone which has large molecular weight and is heavy precipitates near the bottom at the ground plane side, and carbon monoxide which has small molecular weight and is light stays near the top at the side opposite to ground plane.

As a result, the air chamber 51a arranged at the ground plane side in the sealed container 8 accumulates the unnecessary gas with specific gravity heavier than the arc-extinguishing gas, such as ozone. The chamber 51b arranged at the side opposite to ground plane in the sealed container 8 accumulates the unnecessary gas with specific gravity lighter than the arc-extinguishing gas, such as carbon monoxide.

Ozone precipitated near the bottom of the sealed container 8 dissociates and recombines, and returns to $O_2$ by the reactions 6 and 7.

Reaction 5 needs to occur for CO staying in the top of the sealed container 8 to return to $CO_2$. However, O hardly exists near the top of the sealed container 8, that is, at the side opposite to ground plane, where much of CO exists. Therefore, CO near the top does no react and continues to stay.

There is a concern that $O_3$ may oxidatively deteriorate sealing material (not illustrated) for sealing gas inside the sealed container 8. Furthermore, $O_3$ reduces electrical insulation characteristic of the gas circuit breaker 1. In addition, $O_3$ is harmful to human.

There is a concern that CO may reduce electrical insulation characteristic of the gas circuit breaker 1. Furthermore, CO is harmful to human. It is no preferable for workers to inhale CO existing in the sealed container 8 at the time of periodic inspection, etc.

The air chambers 51a and 51b accumulate the unnecessary gas generated from the arc-extinguishing gas sprayed to the arc. The air chamber 51a arranged at the ground plane side in the sealed container 8 accumulates the unnecessary gas with specific gravity heavier than the arc-extinguishing gas, such as ozone, and the unnecessary gas flowing out to the exterior of the air chamber 51a is reduced. The chamber 51b arranged at the side opposite to ground plane in the sealed container 8 accumulates the unnecessary gas with specific gravity lighter than the arc-extinguishing gas, such as carbon monoxide, and the unnecessary gas flowing out to the exterior of the air chamber 51b is reduced.

By the experiment by the inventors, it is discovered that the arc-extinguishing gas sprayed to the arc generates ozone of about 0.01% of volume of the sealed container 8. The volume of the air chamber 51a is equal to or more than 0.01% of volume of the sealed container 8, and the air chamber 51a accumulates the unnecessary gas with specific gravity heavier than the arc-extinguishing gas, such as ozone.

By the experiment by the inventors, it is discovered that the arc-extinguishing gas sprayed to the arc generates carbon monoxide of about 0.01% of volume of the sealed container 8. The volume of the air chamber 51b is equal to or more than 0.01% of volume of the sealed container 8, and the air chamber 51a accumulates the unnecessary gas with specific gravity lighter than the arc-extinguishing gas, such as carbon monoxide.

Among the unnecessary gas generated from the arc-extinguishing gas sprayed to the arc, the unnecessary gas with specific gravity heavier than the arc-extinguishing gas, such as ozone, falls to the ground plane side in the sealed container 8. Furthermore, the unnecessary gas with specific gravity heavier than the arc-extinguishing gas, such as ozone, falls along the tapered portions 82a and 83a at the ground plane side inside the hollow truncated cone portions 82 and 83 of the sealed container 8, and is accumulated in the air chamber 51a. The air chamber 51a accumulates the unnecessary gas with specific gravity heavier than the arc-extinguishing gas, such as ozone. The volume of the air chamber 51a is preferably equal to or more than 0.01% of the volume of the sealed container 8.

Among the unnecessary gas generated from the arc-extinguishing gas sprayed to the arc, the unnecessary gas with specific gravity lighter than the arc-extinguishing gas, such as carbon monoxide, rises to the side opposite to ground plane in the sealed container 8. Furthermore, the unnecessary gas with specific gravity heavier than the arc-extinguishing gas, such as carbon monoxide, rises along the tapered portions 82b and 83b at the side opposite to ground plane inside the hollow truncated cone portions 82 and 83 of the sealed container 8, and is accumulated in the air chamber 51b. The air chamber 51b accumulates the unnecessary gas with specific gravity lighter than the arc-extinguishing gas, such as carbon monoxide. The volume of the air chamber 51b is preferably equal to or more than 0.01% of the volume of the sealed container 8.

Furthermore, the air chamber 51a and the air chamber 51b are arranged in the sealed container which is on the line from the arc space that is the arc generation space perpendicular to the ground plane and which is between the fixed arc contactor 21 and the movable arc contactor 31, and accumulate the unnecessary gas generated in the arc space before the unnecessary gas is dispersed in the sealed container 8.

1-3. Effect (1) According to the present embodiment, since the gas circuit breaker 1 includes the sealed container 8 containing the arc-extinguishing gas, the first fixed contactor portion 2 fixed to the sealed container 8, the second fixed contactor portion 4 fixed to the sealed container 8, and the movable contactor portion 3 for conducting and breaking current between the first fixed contactor portion 2 and the second fixed contactor portion 4 by moving between the first fixed contactor portion 2 and the second fixed contactor portion 4 are provided, and the arc generated between the fixed arc contactor 21 provided to the first fixed contactor portion 2 and the movable arc contactor 31 provided to the movable contactor portion 3 at a time of current breaking action is extinguished by the arc-extinguishing gas being sprayed thereto, and also includes the gas chamber 5 to accumulate the unnecessary gas generated from the arc-extinguishing gas sprayed to the arc, the gas circuit breaker 1 that can reduce the deterioration of insulation performance thereof and current breaking performance thereof by the unnecessary gas generated from the arc-extinguishing gas sprayed to the arc can be provided.

Since the unnecessary gas generated from the arc-extinguishing gas sprayed to the arc is accumulated in the gas chamber 5, and is hard to contact with the insulation material, the first fixed contactor portion 2, the second fixed contactor portion 4, and the movable contactor portion 3 forming the gas circuit breaker 1, the deterioration of insulation performance and current breaking performance of the gas circuit breaker 1 by the unnecessary gas generated from the arc-extinguishing gas sprayed to the arc can be reduced.

(2) According to the present embodiment, since the air chamber 5 includes the air chamber 51a for accumulating the unnecessary gas with specific gravity heavier than the arc-extinguishing gas arranged at the ground plane side, so that the unnecessary gas with specific gravity heavier than the arc-extinguishing gas, such as ozone, generated from the arc-extinguishing gas sprayed to the arc is accumulated in the air chamber 5, the insulation material, the first fixed contactor portion 2, the second fixed contactor portion 4, and the movable contactor portion 3 forming the gas circuit breaker is hard to contact with the unnecessary gas, and the deterioration of insulation performance and current breaking performance of the gas circuit breaker 1 by the unnecessary gas can be reduced.

(3) According to the present embodiment, since the air chamber 5 includes the air chamber 51b for accumulating the unnecessary gas with specific gravity lighter than the arc-extinguishing gas arranged at the side opposite to ground plane, so that the unnecessary gas with specific gravity lighter than the arc-extinguishing gas, such as carbon monoxide, generated from the arc-extinguishing gas sprayed to the arc is accumulated in the air chamber 5, the insulation material, the first fixed contactor portion 2, the second fixed contactor portion 4, and the movable contactor portion 3 forming the gas circuit breaker 1 is hard to contact with the unnecessary gas, and the deterioration of insulation performance and current breaking performance of the gas circuit breaker 1 by the unnecessary gas can be reduced.

(4) According to the present embodiment, the arc-extinguishing gas is equal to or more than 0.1 MPa-g, and preferably includes equal to or more than 50% of carbon dioxide, the arc-extinguishing gas is less harmful to environment, the gas circuit breaker that can reduce the deterioration of insulation performance and current breaking performance by the unnecessary gas generated from the arc-extinguishing gas sprayed to the arc can be provided.

(5) According to the present embodiment, since volume of the air chamber 5 is equal to or more than 0.01% of volume of the sealed container 8, the gas circuit breaker becomes compact, and the gas circuit breaker that can reduce the deterioration of insulation performance and current breaking performance by the unnecessary gas generated from the arc-extinguishing gas sprayed to the arc can be provided.

(6) According to present embodiment, since the sealed container 8 includes truncated cone portions 82 and 83 and the air chamber 5 is formed inside the flat portions 81*a* and 81*b* of the cylindrical portion 81 to which two hollow truncated cone portions 82 and 83 of the sealed container 8 forming hollow truncated cone is joined, the unnecessary gas is guided to the air chamber 5 by the tapered portions 82*a*, 82*b*, 83*a*, and 83*b* forming the truncated cone portions 82 and 83 of the sealed container 8, and the unnecessary gas can be accumulated in the air chamber 5 more surely.

(7) According to the present embodiment, since the sealed container 8 has a shape in which the ends of two truncated cone portions 82 and 83 with large opening diameter is joined, and the air chamber 5 is formed inside the cylindrical portion 81 to which two truncated cone portions 82 and 83 forming the sealed container 8 is joined, the air chamber 5 can be arranged near the place where the arc-extinguishing gas is sprayed to. As a result, the unnecessary gas can be guided to the air chamber 5 more surely, and the unnecessary gas can be accumulated in the air chamber 5.

Furthermore, since the sealed container 8 has a shape in which the ends of two truncated cone portions 82 and 83 with large opening diameter is joined, the member of the two truncated cone portions 82 and 83 forming the sealed container 8 can be manufactured by the same manufacturing process, and are easy to manufacture. Therefore, the gas circuit breaker that can be easily manufactured can be provided.

1-4. Modified Example (1) First Modified Example

The air chamber 5 is not limited to the above described configuration. The air chamber 5 may be formed as illustrated in FIG. 3.

In the above embodiment, the sealed container 8 has the ends of two truncated cone portions 82 and 83 with the large diameter joined via the cylindrical portion 81, in which the cylindrical portion 81 to which two truncated cone portions 82 and 83 are joined includes the air chambers 51*a* and 51*b* inside thereof. However, the air chambers 51*a* and 51*b* are not limited to the above configuration.

Figure 3:
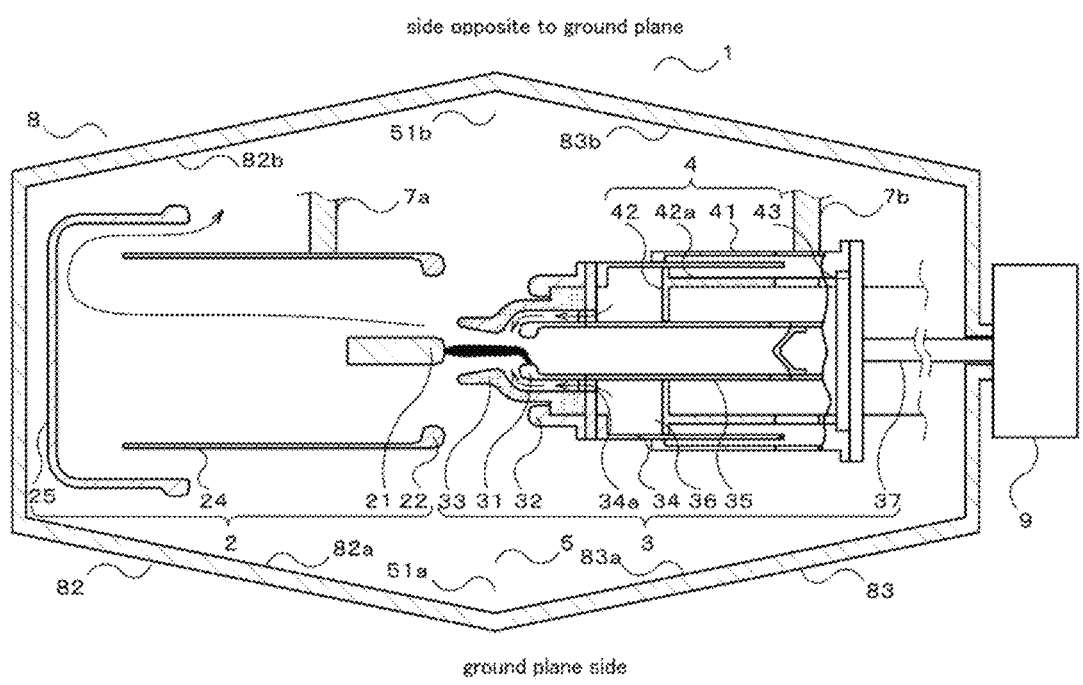
FIG. 3 is a diagram illustrating a structure of the gas circuit breaker according to the first modified example of the first embodiment.

In the sealed container illustrated in FIG. 3, the ends of the two hollow truncated cone portions 82 and 83 are directly joined to each other, and the interior of the joined truncated cone portions 82 and 83 includes the air chambers 51*a* and 51*b*.

The air chambers 51*a* and 51*b* are arranged inside two truncated cone portions 82 and 83 at where the ends with the large diameter are joined.

The air chamber 51*a* is formed inside the joined portion of the truncated cone portions 82 and 83 at the ground plane side in the sealed container 8. The air chamber 51*b* is formed inside the joined portion of the truncated cone portions 82 and 83 at the side opposite to ground plane in the sealed container 8.

The air chamber 51*a* accumulates the unnecessary gas with the specific gravity heavier than the arc-extinguishing gas, such as ozone, generated from the arc-extinguishing gas sprayed to the arc. The air chamber 51*b* accumulates the unnecessary gas with the specific gravity lighter than the arc-extinguishing gas, such as carbon monoxide, generated from the arc-extinguishing gas sprayed to the arc.

Since the sealed container 8 has a shape in which the ends of two truncated cone portions 82 and 83 with large opening diameter is joined, the member of the two truncated cone portions 82 and 83 forming the sealed container 8 can be manufactured by the same manufacturing process, and are easy to manufacture. Therefore, the gas circuit breaker that can be easily manufactured can be provided.

(2) Second Modified Example

The air chamber 5 is not limited to the above described configuration. The air chamber 5 may be formed as illustrated in FIG. 4.

Figure 4:
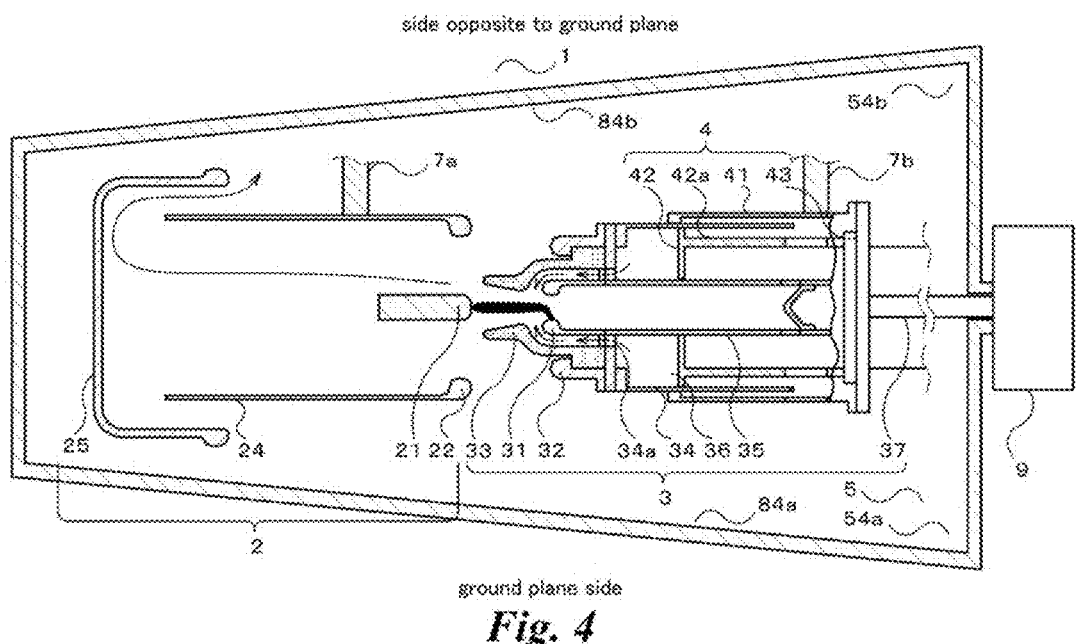
FIG. 4 is a diagram illustrating a structure of the gas circuit breaker according to the second modified example of the first embodiment.

As illustrated in FIG. 4, the sealed container 8 is one hollow truncated cone portion, and includes air chambers 54*a* and 54*b* for accumulating the unnecessary gas generated from the arc-extinguishing gas sprayed to the arc inside the end of the truncated cone portion with the large diameter.

As illustrated in FIG. 4, the sealed container 8 is formed by a hollow truncated cone portion with the bottom. The sealed container 8 is arranged such that the bottom of the hollow truncated cone portion with the large diameter is in the driving-device direction. The sealed container 8 has the air chambers 54*a* and 54*b* inside the hollow truncated cone portion at bottom side with the large diameter.

The air chamber 54*a* is formed inside the bottom of the hollow truncated cone portion with the large diameter at the ground plane side. The air chamber 54*b* is formed inside the bottom of the hollow truncated cone portion with the large diameter at the side opposite to ground plane. The air chambers 54*a* and 54*b* accumulate the unnecessary gas generated from the arc-extinguishing gas sprayed to the arc.

Among the unnecessary gas generated from the arc-extinguishing gas sprayed to the arc, the unnecessary gas with specific gravity heavier than the arc-extinguishing gas, such as ozone, falls to the ground plane side in the sealed container 8. Furthermore, the unnecessary gas with specific gravity heavier than the arc-extinguishing gas, such as ozone, falls along the tapered portions 84*a* at the ground plane side inside the hollow truncated cone portion of the sealed container 8, and is accumulated in the air chamber 54*a*. The air chamber 54*a* accumulates the unnecessary gas with specific gravity heavier than the arc-extinguishing gas, such as ozone. The volume of the air chamber 54*a* is preferably equal to or more than 0.01% of the volume of the sealed container 8.

Among the unnecessary gas generated from the arc-extinguishing gas sprayed to the arc, the unnecessary gas with specific gravity lighter than the arc-extinguishing gas, such as carbon monoxide, rises to the side opposite to ground plane in the sealed container 8. Furthermore, the unnecessary gas with specific gravity heavier than the arc-extinguishing gas, such as carbon monoxide, rises along the tapered portion 84*b* at the side opposite to ground plane inside the hollow truncated cone portion of the sealed container 8, and is accumulated in the air chamber 51*b*. The air chamber 54*b* accumulates the unnecessary gas with specific gravity lighter than the arc-extinguishing gas, such as carbon monoxide. The volume of the air chamber 84*b* is preferably equal to or more than 0.01% of the volume of the sealed container 8.

According to the embodiment, since the second modified example has the air chambers 54*a* and 54*b* for accumulating the unnecessary gas generated from the arc-extinguishing gas sprayed to the arc, the gas circuit breaker that can reduce the deterioration of insulation performance thereof and current breaking performance thereof by the unnecessary gas generated from the arc-extinguishing gas sprayed to the arc can be provided.

Since the unnecessary gas generated from the arc-extinguishing gas sprayed to the arc is accumulated in the air chambers 54a and 54b, the insulation material, the first fixed contactor portion 2, the second fixed contactor portion 4, and the movable contactor portion 3 forming the gas circuit breaker 1 is hard to contact with the unnecessary gas, and the deterioration of insulation performance and current breaking performance of the gas circuit breaker 1 by the unnecessary gas can be reduced.

According to the embodiment according to the second modified example, since the sealed container 8 is in the truncated cone shape, and the air chambers 54a and 54b are formed inside the sealed container 8 forming the hollow truncated cone shape at the bottom with the large diameter, the unnecessary gas is guided to the air chambers 54a and 54b by the tapered portions 84a and 84b forming the truncated cone shape of the sealed container, and the unnecessary gas can be accumulated in the air chamber 5 more surely.

Figure 5:
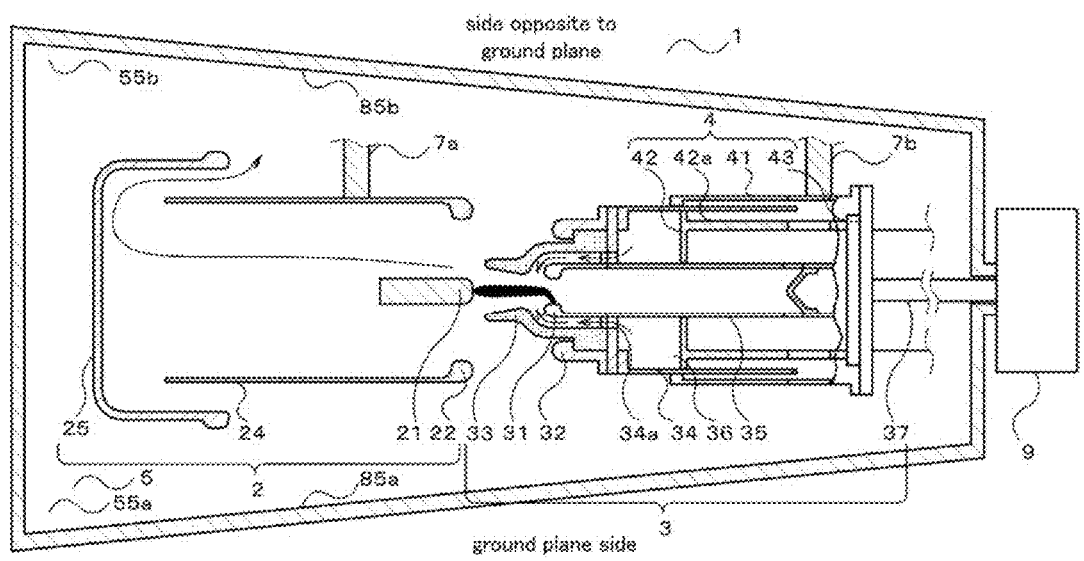
FIG. 5 is a diagram illustrating a structure of the gas circuit breaker according to another form of the second modified example of the first embodiment.

In the embodiment according to the second modified example, although the sealed container 8 is arranged so that the bottom of the hollow truncated cone shape with the large diameter is in the driving-device direction, and the air chambers 54a and 54b is arranged inside the hollow truncated cone shape at the bottom with the large diameter, the sealed container 8 may be arranged so that the bottom of the hollow truncated cone shape with the large diameter is in the open-end direction, and air chambers 55a and 55b may be arranged inside the hollow truncated cone shape at the bottom with the large diameter, as illustrated in FIG. 5. The sealed container 8 includes tapered portions 85a and 85b, and the unnecessary gas is guided by the tapered portions 85a and 85b, and is accumulated in the air chamber 5.

Thus, by arranging the bottom of the sealed container 8 forming the hollow truncated cone shape with the large diameter is in the open-end direction, the installation location of the gas circuit breaker can be selected flexibly.

(3) Third Modified Example

The air chamber 5 is not limited to the above described configuration. The air chamber 5 may be formed as illustrated in FIGS. 6 and 7.

Figure 6:
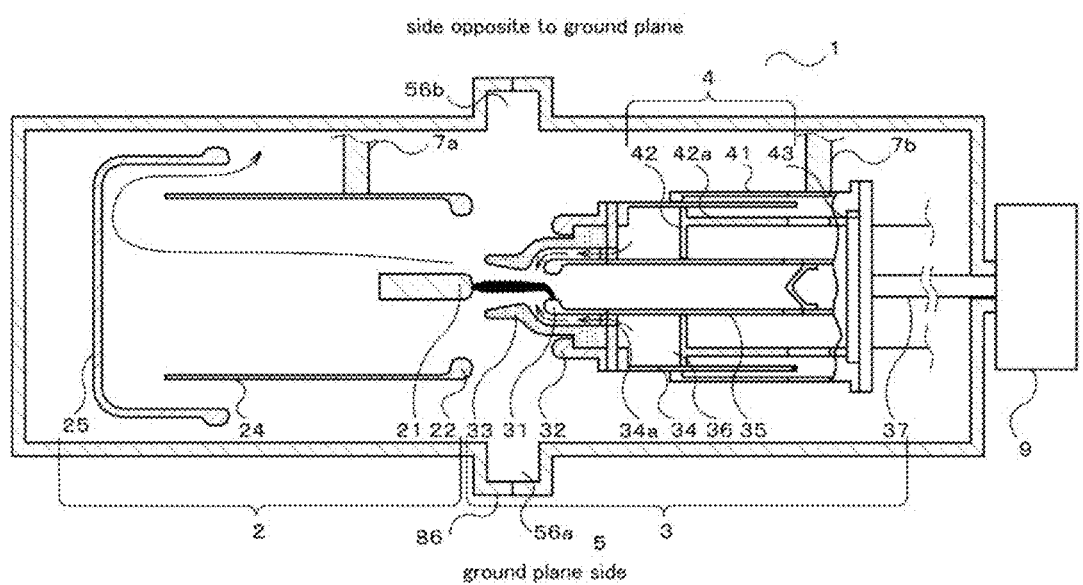
FIG. 6 is a diagram illustrating a structure of the gas circuit breaker according to the third modified example of the first embodiment.
Figure 7:
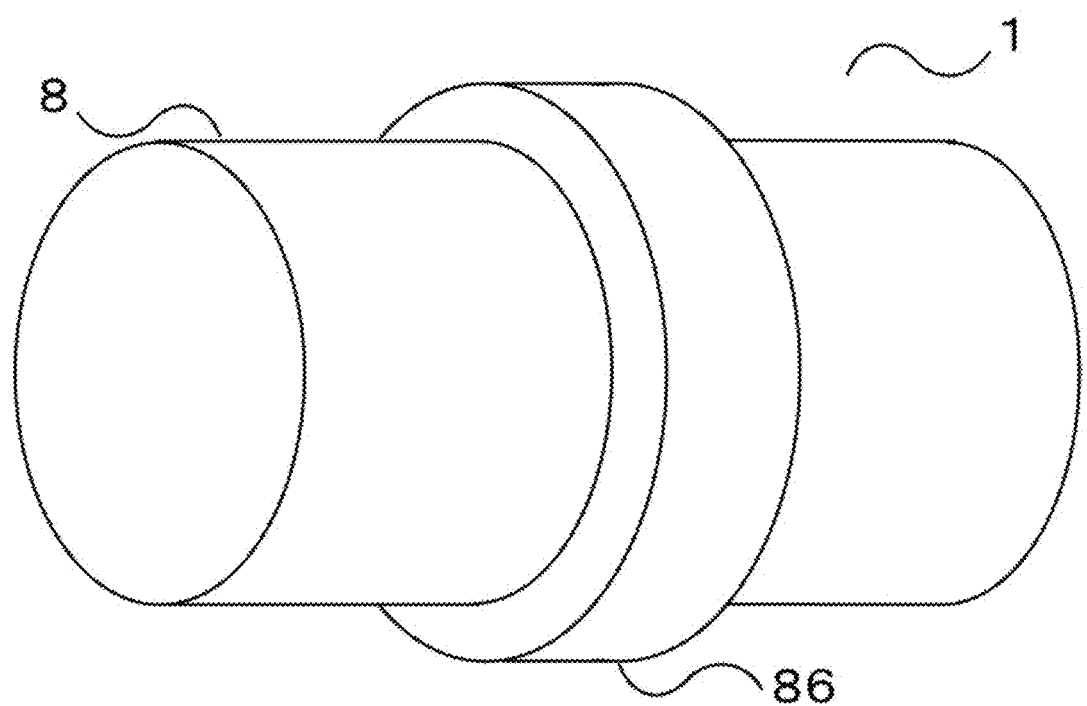
FIG. 7 is a diagram illustrating an appearance of the gas circuit breaker according to the third modified example of the first embodiment.

As illustrated in FIGS. 6 and 7, the sealed container 8 further includes a cylindrical portion 86 with inner diameter larger than the inner diameter of the sealed container 8 at middle portion of the circumference of the cylindrical member forming the sealed container 8. The sealed container includes air chambers 56a and 56b inside the cylindrical portion 86. The air chambers 56a and 546b accumulate the unnecessary gas generated from the arc-extinguishing gas sprayed to the arc.

The cylindrical portion 86 which has the inner diameter larger than the inner diameter of the sealed container and which is arranged at the middle portion of the circumference of the cylindrical member forming the sealed container 8 is formed of hollow tire-shape, and has a space which has cross-section from the cylinder axis in the cylinder circumference direction that is U-shape. The air chamber 56a is provided in the space that is U-shape of the cylindrical portion 86 at the ground plane side. Furthermore, the air chamber 56b is provided in the space that is U-shape of the cylindrical portion 86 at the side opposite to ground plane.

The air chambers 56a and 56b are formed of the same materials as the sealed container 8. The cylindrical portion 86 having the air chambers 56a and 56b is joined integrally with the sealed container 8, and ensures airtightness of the arc-extinguishing gas.

The air chamber 56a accumulates the unnecessary gas with specific gravity heavier than the arc-extinguishing gas, such as ozone. The volume of the air chamber 56a is preferably equal to or more than 0.01% of the volume of the sealed container 8. The air chamber 56b accumulates the unnecessary gas with specific gravity lighter than the arc-extinguishing gas, such as carbon monoxide. The volume of the air chamber 56b is preferably equal to or more than 0.01% of the volume of the sealed container 8.

The air chamber 56a and the air chamber 56b are arranged in the sealed container 8 which is on the line from the arc space that is the arc generation space perpendicular to the ground plane and which is between the fixed arc contactor 21 and the movable arc contactor 31.

The air chambers 56a and 56b accumulate the unnecessary gas generated from the arc-extinguishing gas sprayed to the arc. The air chamber 56a arranged at the ground plane side of the sealed container 8 accumulates the unnecessary gas with specific gravity heavier than the arc-extinguishing gas, such as ozone, and the unnecessary gas flowing out to the exterior of the air chamber 56a is reduced. The chamber 56b arranged at the side opposite to ground plane of the sealed container 8 accumulates the unnecessary gas with specific gravity lighter than the arc-extinguishing gas, such as carbon monoxide, and the unnecessary gas flowing out to the exterior of the air chamber 56b is reduced.

According to the embodiment, since the third modified example has the air chambers 56a and 56b for accumulating the unnecessary gas generated from the arc-extinguishing gas sprayed to the arc, the gas circuit breaker that can reduce the deterioration of insulation performance thereof and current breaking performance thereof by the unnecessary gas generated from the arc-extinguishing gas sprayed to the arc can be provided.

Since the unnecessary gas generated from the arc-extinguishing gas sprayed to the arc is accumulated in the air chambers 56a and 56b, the insulation material, the first fixed contactor portion 2, the second fixed contactor portion 4, and the movable contactor portion 3 forming the gas circuit breaker 1 is hard to contact with the unnecessary gas, and the deterioration of insulation performance and current breaking performance of the gas circuit breaker 1 by the unnecessary gas can be reduced.

According to the embodiment according to the third modified example, since the air chamber 56a accumulates the unnecessary gas with specific gravity heavier than the arc-extinguishing gas, such as ozone, generated from the arc-extinguishing gas sprayed to the arc, and the air chamber 56b accumulates the unnecessary gas with specific gravity lighter than the arc-extinguishing gas, such as carbon monoxide, generated from the arc-extinguishing gas sprayed to the arc, the insulation material, the first fixed contactor portion 2, the second fixed contactor portion 4, and the movable contactor portion 3 forming the gas circuit breaker 1 is hard to contact with the unnecessary gas, and the deterioration of insulation performance and current breaking performance of the gas circuit breaker 1 by the unnecessary gas can be reduced.

According to the embodiment according to the third modified example, since the sealed container 8 is in a cylindrical shape, and the air chambers 56a and 65b are formed inside the cylindrical portion 86 in tire-shape having the inner diameter larger than the inner diameter of the sealed container 8, the volume of the sealed container 8 can be reduced. As a result, compact gas circuit breaker that is easy to install in small installation location can be provided.

In the embodiment according to the third modified example, although the cylindrical portion 86 having the air chambers 56a and 56b are arranged at the middle portion of the sealed container 8, the location where the cylindrical portion 86 is arranged is not limited thereto. The cylindrical portion 86 having the air chambers 56a and 56b may be arranged to the end of the sealed container at the cylinder surface.

Thus, by arranging the cylindrical portion 86 having the air chambers 56a and 56b, the installation location of the gas circuit breaker can be selected flexibly.

(4) Fourth Modified Example

The air chamber 5 is not limited to the above described configuration. The air chamber 5 may be formed as illustrated in FIGS. 8 and 9.

Figure 8:
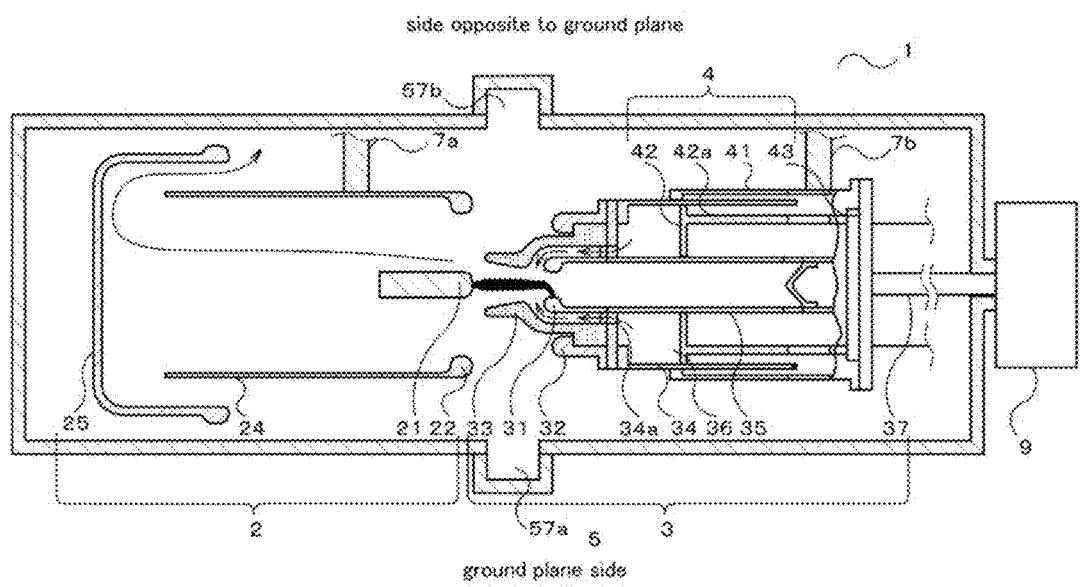
FIG. 8 is a diagram illustrating a structure of the gas circuit breaker according to the forth modified example of the first embodiment.
Figure 9:
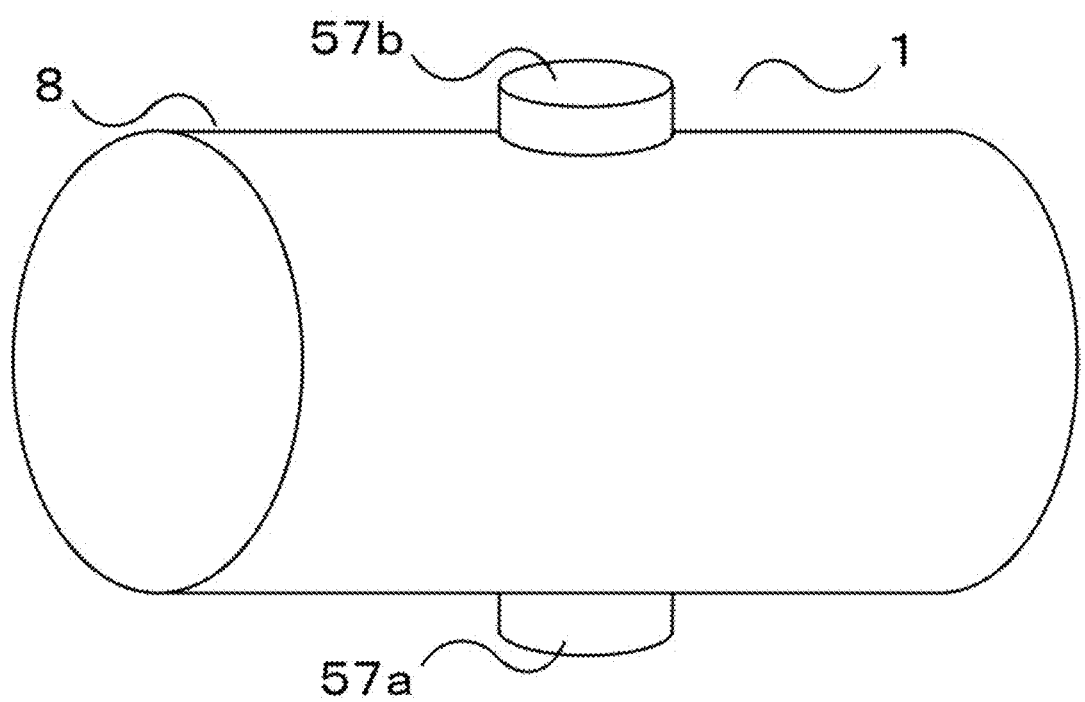
FIG. 9 is a diagram illustrating an appearance of the gas circuit breaker according to the forth modified example of the first embodiment.

As illustrated in FIGS. 8 and 9, the sealed container 8 includes an air chamber 57a and an air chamber 57b formed by cup-shaped member protruding from the circumference of the cylindrical member forming the sealed container 8. The air chambers 57a and 57b are formed of the same materials as the sealed container 8. The air chambers 57a and 57b accumulate the unnecessary gas generated from the arc-extinguishing gas sprayed to the arc.

The air chamber 57a is cup-shaped member arranged and protruding from the exterior of the sealed container 8 at the ground plane side. The opening of the cup-shape of the air chamber 57a is joined with the interior of the sealed container 8. The air chamber 57a is joined integrally with the sealed container 8, and ensures airtightness of the arc-extinguishing gas filled in the sealed container 8. The air chamber 57a accumulates the unnecessary gas with specific gravity heavier than the arc-extinguishing gas, such as ozone. The volume of the air chamber 57a is preferably equal to or more than 0.01% of the volume of the sealed container 8.

The air chamber 57b is cup-shaped member arranged and protruding from the exterior of the sealed container 8 at the side opposite to ground plane. The opening of the cup-shape of the air chamber 57b is joined with the interior of the sealed container 8. The air chamber 57b is joined integrally with the sealed container 8, and ensures airtightness of the arc-extinguishing gas filled in the sealed container 8. The air chamber 57b accumulates the unnecessary gas with specific gravity lighter than the arc-extinguishing gas, such as carbon monoxide. The volume of the air chamber 57b is preferably equal to or more than 0.01% of the volume of the sealed container 8.

The air chamber 57a and the air chamber 57b are arranged in the sealed container 8 which is on the line from the arc space that is the arc generation space perpendicular to the ground plane and which is between the fixed arc contactor 21 and the movable arc contactor 31.

The air chambers 57a and 57b accumulate the unnecessary gas generated from the arc-extinguishing gas sprayed to the arc. The air chamber 57a arranged at the ground plane side of the sealed container 8 accumulates the unnecessary gas with specific gravity heavier than the arc-extinguishing gas, such as ozone, and the unnecessary gas flowing out to the exterior of the air chamber 57a is reduced. The chamber 56b arranged at the side opposite to ground plane of the sealed container 8 accumulates the unnecessary gas with specific gravity lighter than the arc-extinguishing gas, such as carbon monoxide, and the unnecessary gas flowing out to the exterior of the air chamber 57b is reduced.

According to the embodiment, since the fourth modified example has the air chambers 57a and 57b for accumulating the unnecessary gas generated from the arc-extinguishing gas sprayed to the arc, the gas circuit breaker that can reduce the deterioration of insulation performance thereof and current breaking performance thereof by the unnecessary gas generated from the arc-extinguishing gas sprayed to the arc can be provided.

Since the unnecessary gas generated from the arc-extinguishing gas sprayed to the arc is accumulated in the air chambers 57a and 57b, the insulation material, the first fixed contactor portion 2, the second fixed contactor portion 4, and the movable contactor portion 3 forming the gas circuit breaker 1 is hard to contact with the unnecessary gas, and the deterioration of insulation performance and current breaking performance of the gas circuit breaker 1 by the unnecessary gas can be reduced.

According to the embodiment according to the fourth modified example, since the air chamber 76a accumulates the unnecessary gas with specific gravity heavier than the arc-extinguishing gas, such as ozone, generated from the arc-extinguishing gas sprayed to the arc, and the air chamber 57b accumulates the unnecessary gas with specific gravity lighter than the arc-extinguishing gas, such as carbon monoxide, generated from the arc-extinguishing gas sprayed to the arc, the insulation material, the first fixed contactor portion 2, the second fixed contactor portion 4, and the movable contactor portion 3 forming the gas circuit breaker 1 is hard to contact with the unnecessary gas, and the deterioration of insulation performance and current breaking performance of the gas circuit breaker 1 by the unnecessary gas can be reduced.

According to the embodiment according to the fourth modified example, since the sealed container 8 is formed in a cup-shaped member protruding from the sealed container 8, the volume of the sealed container 8 can be reduced. As a result, compact gas circuit breaker that is easy to install in small installation location can be provided.

In the embodiment according to the fourth modified example, since the sealed container 8 is formed in a cup-shaped member protruding from the sealed container 8, the air chambers 57a and 57b can be formed by simple members, and the gas circuit breaker that can be easily manufactured can be provided In the embodiment according to the fourth modified example, although the air chambers 57a and 57b are formed in a cup-shaped member protruding from the circumference of the cylindrical portion forming the sealed container 8, the installation location of the air chambers 57a and 57b are not limited thereto. The air chambers 57a and 57b may be arranged as illustrated in FIG. 10.

Figure 10:
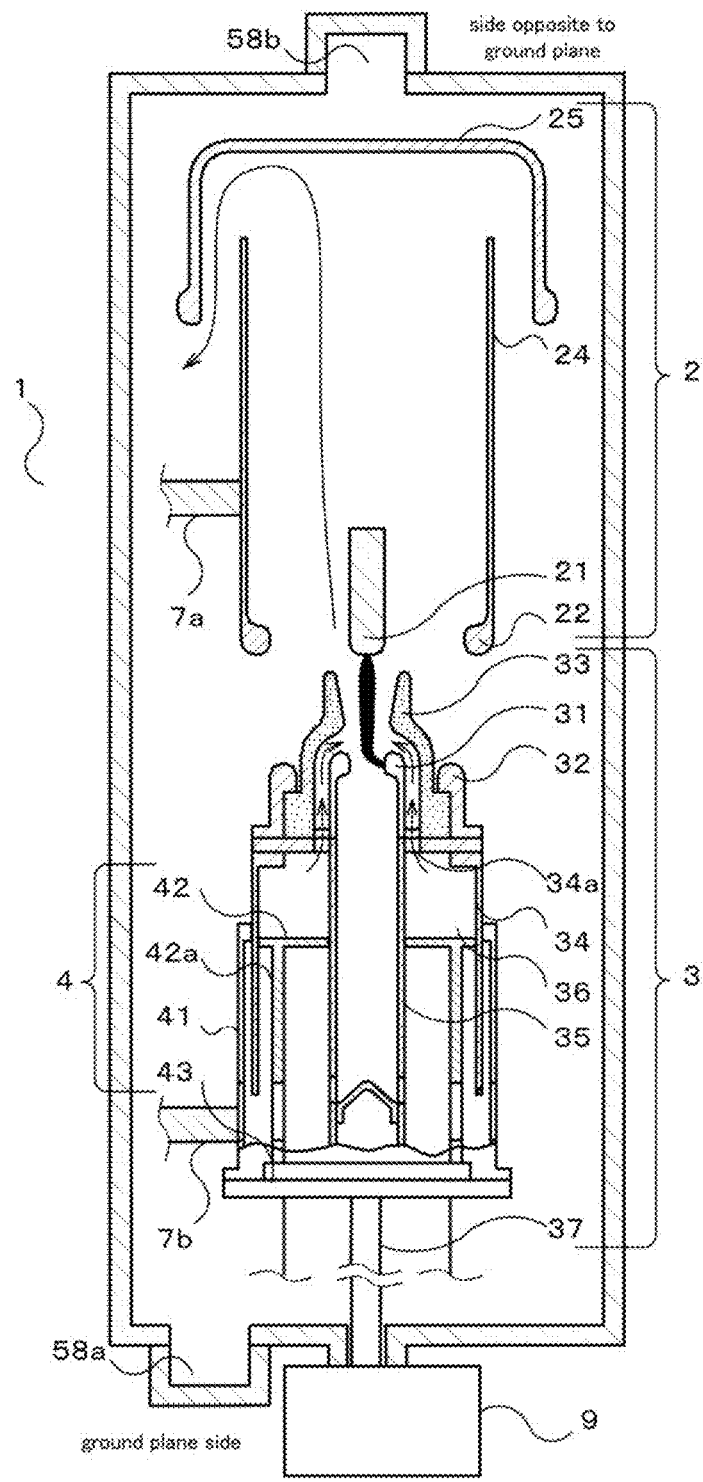
FIG. 10 is a diagram illustrating a structure of the gas circuit breaker according to another form of the forth modified example of the first embodiment.

In the gas circuit breaker 1 illustrated in FIG. 10, the open-end direction is in the side opposite to the ground plane, and the air chamber 58a is arranged in the cylinder bottom in the ground plane side of the sealed container 8 and the air chamber 58b is arranged in the cylinder top in the side opposite to ground plane of the sealed container 8 to protrude outward.

Thus, by arranging the air chambers 58a and 58b, the installation location of the gas circuit breaker can be selected flexibly. For example, when other apparatuses are installed adjacent to the gas circuit breaker 1, the gas circuit breaker 1 can be installed in a small installation area.

In the embodiment according to the fourth embodiment, the air chambers 57a and 57b or the air chambers 58a and 58b are hollow cup-shaped member arranged and protruding to the exterior of the sealed container 8. the air chambers 57a and 57b or the air chambers 58a and 58b forming cup-shape may be joined the sealed container 8 by machining or welding to have structures not using packing for sealing, etc. By applying structure not using packing for sealing, etc., the deterioration of the sealing material by ozone can be prevented, and the leakage of the arc-extinguishing gas can be reduced.

2. Second Embodiment

2-1. Structure

Figure 11:
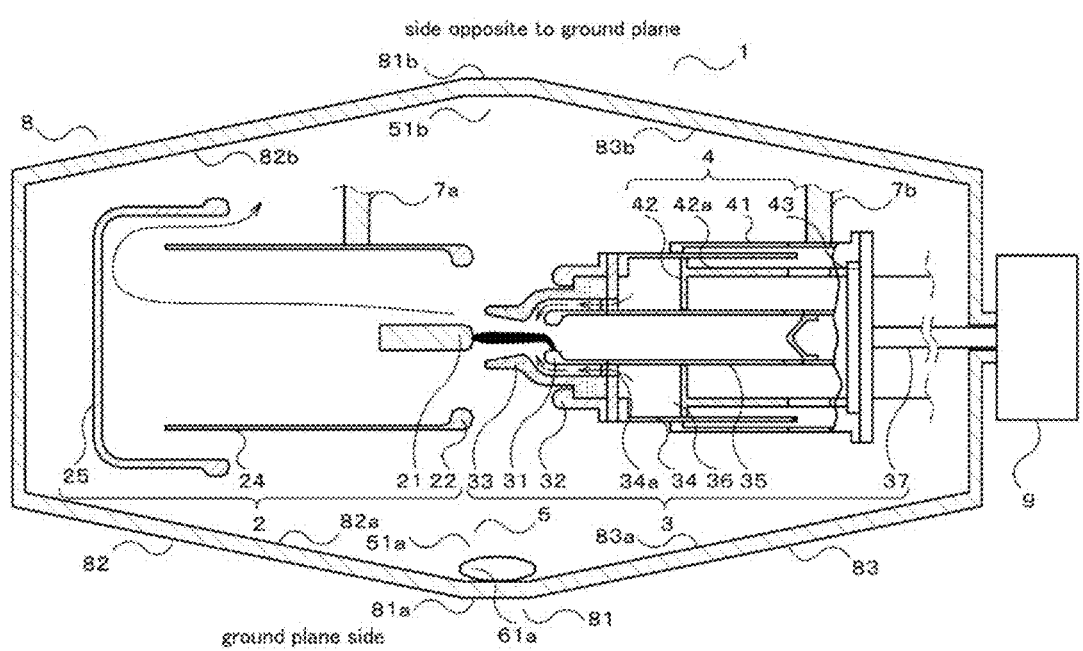
FIG. 11 is a diagram illustrating a structure of the gas circuit breaker according to the second embodiment.

A gas circuit breaker according to a second embodiment is described with the reference to FIG. 11. Note that in the structure of the gas circuit breaker according to a second embodiment, the same parts as the first embodiment shown in FIGS. 1 to 11 are indicated by the same reference signs.

Although the gas circuit breaker 1 according to the first embodiment includes the air chamber 51a in the sealed container 8, the gas circuit breaker according to a second embodiment is different in that the air chamber 51a having an ozone decomposition catalyst 61a is placed in the sealed container 8.

As illustrated in FIG. 11, the sealed container 8 has the cylindrical portion 81 at the joined portion of two hollow truncated cone portions 82 and 83, and the cylindrical portion 81 has the flat portion 81a at the ground plane side and the flat portion 81b at the side opposite to ground plane. The air chamber 51a for accumulating unnecessary gas with the specific gravity heavier than the arc-extinguishing gas, such as ozone, is arranged inside the flat portion 81a of the cylindrical portion 81 at the ground plane side, and the ozone decomposition catalyst 61a is placed in the air chamber 51a. The air chamber 51b for accumulating unnecessary gas with the specific gravity lighter than the arc-extinguishing gas, such as carbon monoxide, is arranged inside the flat portion 81b of the cylindrical portion 81 at the side opposite to ground plane, as the first embodiment.

2-2. Effect

Between the fixed arc contactor 21 and the movable arc contactor 31 becomes so-called arc-plasma state by the arc generated at the time of current breaking action. The arc-extinguishing gas in the arc-plasma state becomes high temperature and high pressure and reacts to generate the unnecessary gas. Particles which has large molecular weight and which is heavy is precipitated in the bottom of the sealed container, that is, at the ground plane side, and particles which has small molecular weight and which is light rises to and is accumulated in the upper portion of the sealed container 8, that is, at the side opposite to ground plane.

The air chambers 51a and 51b accumulate the unnecessary gas generated from the arc-extinguishing gas sprayed to the arc. The air chamber 51a arranged at the ground plane side of the sealed container 8 accumulates the unnecessary gas with specific gravity heavier than the arc-extinguishing gas, such as ozone, and the unnecessary gas flowing out to the exterior of the air chamber 51a is reduced. The chamber 51b arranged at the side opposite to ground plane of the sealed container 8 accumulates the unnecessary gas with specific gravity lighter than the arc-extinguishing gas, such as carbon monoxide, and the unnecessary gas flowing out to the exterior of the air chamber 51b is reduced.

The ozone decomposition catalyst 61a placed in the air chamber 51a is formed of activated carbon. The activated carbon is arranged at the bottom of the air chamber 51a. Ozone $O_3$ is decomposed by the ozone decomposition catalyst 61a that is activated carbon as follows.

$$2O_3 + C \rightarrow CO_2 + CO_2 + 679 \text{ kJ} \quad \text{(Reaction 9)}$$

Above reaction is an exothermic reaction, and generates high temperature. The ozone decomposition reaction of the aforementioned reactions 6 and 7 are further accelerated by the heat generation by the reaction.

Activated carbon is generally known as adsorbent, and has high adsorption effect relative to non-polar material. Activated carbon is formed of carbon, and carbon produces catalytic reaction of following reactions 10 and 11 relative to ozone.

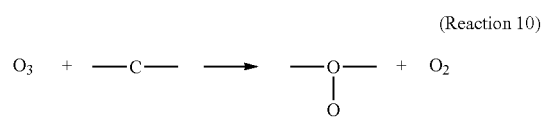

(Reaction 10)

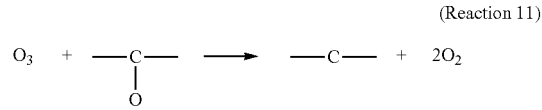

(Reaction 11)

The ozone decomposition catalyst 61a that is activated carbon decomposes ozone that is the unnecessary gas generated from the arc-extinguishing gas sprayed to the arc.

As an alternative to or in addition to activated carbon, the ozone decomposition catalyst 61a may be manganese, aluminum, cerium, barium, platinum, palladium, rhodium, and ruthenium. Dissociation and recombination reaction of oxygen atom shown in the above reactions 10 and 11 can be achieved by using manganese, aluminum, cerium, barium, platinum, palladium, rhodium, and ruthenium, other than carbon.

Furthermore, activated carbon has $H_2O$ adsorption effect. The ozone decomposition catalyst 61a placed at the bottom of the air chamber 51a adsorbs moisture in the sealed container 8. In addition, the ozone decomposition catalyst that is activated carbon adsorbs hydrogen fluoride.

2-3. Effect (1) According to the present embodiment, since the ozone decomposition catalyst 61a is placed in the air chamber 51a, ozone that is the generated unnecessary gas is decomposed.

(2) According to the present embodiment, since ozone that is the unnecessary gas generated from the arc-extinguishing gas sprayed to the arc is decomposed by the ozone decomposition catalyst 61a, the insulation material, the first fixed contactor portion 2, the second fixed contactor portion 4, and the movable contactor portion 3 forming the gas circuit breaker 1 is hard to contact with the unnecessary gas, and the deterioration of insulation performance and current breaking performance of the gas circuit breaker 1 by the unnecessary gas can be reduced.

(3) According to the present embodiment, since the ozone decomposition catalyst 61a includes at least one of manganese, aluminum, cerium, barium, platinum, palladium, rhodium, and ruthenium, by using general catalyst, the gas circuit breaker that can reduce the deterioration of insulation performance thereof and current breaking performance thereof by the unnecessary gas generated from the arc-extinguishing gas sprayed to the arc can be provided.

(4) According to the present embodiment, since the ozone decomposition catalyst 61a that is activated carbon is placed at the bottom of the air chamber 51a, moisture in the sealed container 8 can be adsorbed. In addition, since the ozone decomposition catalyst that is activated carbon adsorbs hydrogen fluoride, the deterioration of the gas circuit breaker 1 can be reduced.

Figure 12:
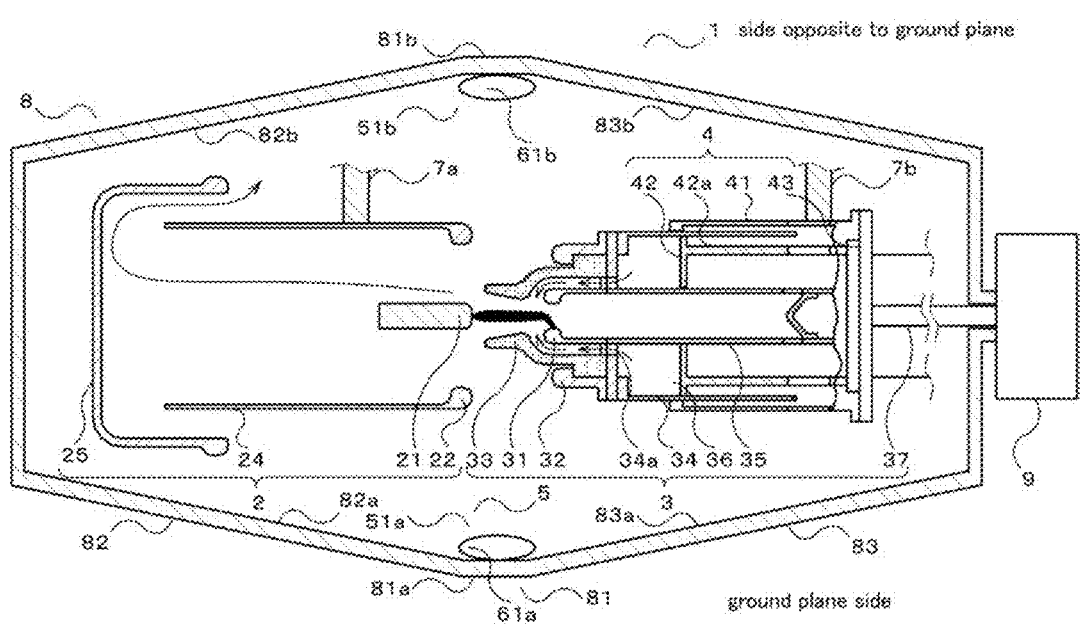
FIG. 12 is a diagram illustrating a structure of the gas circuit breaker according to the first modified example of the second embodiment.

2-4. Modified Example (1) In addition to the above embodiment, as illustrated in FIG. 12, an ozone decomposition catalyst 61b may be placed inside the air chamber 51b in the flat portion 81b at the side opposite to ground plane of the cylindrical portion 81 to which two truncated cone portions 82 and 83 are joined in the sealed container 8.

The ozone decomposition catalyst 61b that is activated carbon reduces carbon monoxide to carbon dioxide as the reaction 12 below, in addition to reaction 10 and reaction 11.

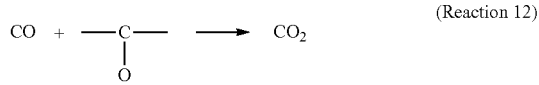

(Reaction 12)

By activated carbon placed in the air chamber 51b, carbon monoxide is reduced to carbon dioxide as the above reaction 12.

Since carbon monoxide is reduced to carbon dioxide by activated carbon placed in the air chamber 51b, the insulation material, the first fixed contactor portion 2, the second fixed contactor portion 4, and the movable contactor portion 3 forming the gas circuit breaker 1 is hard to contact with the unnecessary gas, and the deterioration of insulation performance and current breaking performance of the gas circuit breaker 1 by the unnecessary gas can be reduced.

In addition to the above embodiment, the ozone decomposition catalyst 61a may be placed in the air chamber 51a in the first modified example illustrated in FIG. 3, the air chambers 54a and 55a in the second modified example illustrated in FIGS. 4 and 5, the air chamber 56a in the third modified example illustrated in FIG. 6, and the air chambers 57a and 58a in the fourth modified example illustrated in FIGS. 8 and 10 to decompose ozone. BY such structure, the volume of the sealed container 8 can be reduced. As a result, compact gas circuit breaker that is easy to install in small installation location can be provided.

In addition to the above embodiment, the ozone decomposition catalyst 61b may be placed in the air chamber 51b in the first modified example illustrated in FIG. 3, the air chambers 54b and 55b in the second modified example illustrated in FIGS. 4 and 5, the air chamber 56b in the third modified example illustrated in FIG. 6, and the air chambers 57b and 58b in the fourth modified example illustrated in FIGS. 8 and 10 to decompose ozone. BY such structure, the volume of the sealed container 8 can be reduced. As a result, compact gas circuit breaker that is easy to install in small installation location can be provided.

3. Third Embodiment

3-1. Structure

Figure 13:
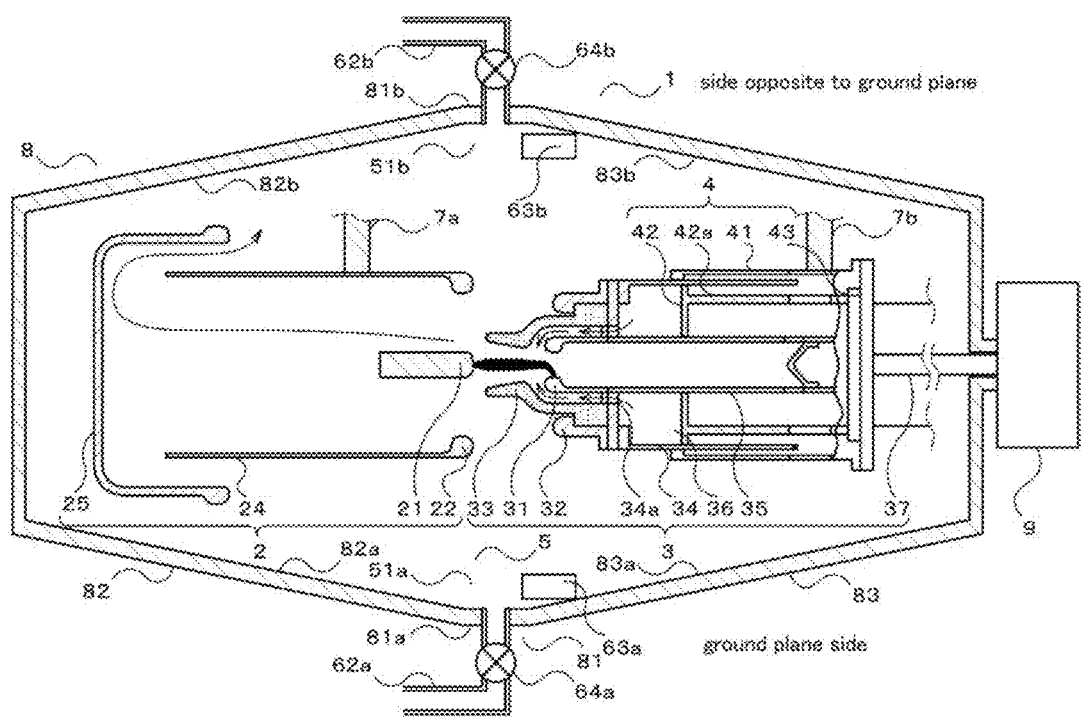
FIG. 13 is a diagram illustrating a structure of the gas circuit breaker according to the third embodiment.

A gas circuit breaker according to a third embodiment is described with the reference to FIG. 13. Note that in the structure of the gas circuit breaker according to a third embodiment, the same parts as the first embodiment shown in FIGS. 1 to 10 are indicated by the same reference signs.

Although the gas circuit breaker 1 according to the first embodiment includes the air chambers 51a and 51b in the sealed container 8, the gas circuit breaker 1 according to the third embodiment is different in that an exhaust pipe 62a connected to the air chamber 51a, an exhaust pipe 62b connected to the air chamber 51b, a sensor 63a arranged near the air chamber 51a, and a sensor 63b arranged near the air chamber 51b are further included.

As illustrated in FIG. 13, the sealed container 8 has the cylindrical portion 81 at the joined portion of two hollow truncated cone portions 82 and 83, and the cylindrical portion 81 has the flat portion 81a at the ground plane side and the flat portion 81b at the side opposite to ground plane. As the first embodiment, the air chamber 51a for accumulating unnecessary gas with the specific gravity heavier than the arc-extinguishing gas, such as ozone, is arranged inside the flat portion 81a of the cylindrical portion 81 at the ground plane side. Furthermore, the air chamber 51b for accumulating unnecessary gas with the specific gravity lighter than the arc-extinguishing gas, such as carbon monoxide, is arranged inside the flat portion 81b of the cylindrical portion 81 at the side opposite to ground plane.

The exhaust pipe 62a is connected to the air chamber 51a provided to the flat portion 81a of the cylindrical portion 81 at the ground plane side. The exhaust pipe 62a forms a flow path in which the unnecessary gas flows from the interior of the sealed container 8 to exterior via the air chamber 51a.

The exhaust pipe 62a is formed by pipe formed of metal, such as aluminum, etc. The exhaust pipe 62a is arranged to the air chamber 51a in the ground plane side of the sealed container 8. Furthermore, the exhaust pipe 62a includes a cock 64a for opening and closing the exhaust pipe 62a in the exterior of the sealed container at the middle portion communicating the interior and the exterior of the sealed container 8.

The exhaust pipe 62a exhausts the unnecessary gas with the specific gravity heavier than the arc-extinguishing gas, that is ozone, generated from the arc-extinguishing gas sprayed to the arc. The cock 64a is opened by the workers, and the unnecessary gas with the specific gravity heavier than the arc-extinguishing gas, that is ozone, generated from the arc-extinguishing gas sprayed to the arc is recovered.

The sensor 63a is formed by an ozone sensor formed of semiconductor. The sensor 63a is a sensor for detecting the unnecessary gas generated from the arc-extinguishing gas sprayed to the arc. The sensor 63a detects the concentration of ozone among the unnecessary gas generated from the arc-extinguishing gas sprayed to the arc. The sensor 63a is arranged near the air chamber 51a in the ground plane side of the sealed container 8. The output signal of the sensor 63a is input to external data logger (not illustrate in figures), etc.

The exhaust pipe 62b is connected to the air chamber 51b provided to the flat portion 81b of the cylindrical portion 81 at the side opposite to ground plane. The exhaust pipe 62b forms a flow path in which the unnecessary gas flows from the interior of the sealed container 8 to exterior via the air chamber 51b.

The exhaust pipe 62b is formed by pipe formed of metal, such as aluminum, etc. The exhaust pipe 62b is arranged to the ground plane side of the air chamber 51b of the sealed container 8. Furthermore, the exhaust pipe 62b includes a cock 64b for opening and closing the exhaust pipe 62b in the exterior of the sealed container at the middle portion communicating the interior and the exterior of the sealed container 8.

The exhaust pipe 62b exhausts the unnecessary gas with the specific gravity lighter than the arc-extinguishing gas, that is carbon monoxide, generated from the arc-extinguishing gas sprayed to the arc. The cock 64b is opened by the workers, and the unnecessary gas with the specific gravity lighter than the arc-extinguishing gas, that is carbon monoxide, generated from the arc-extinguishing gas sprayed to the arc is recovered.

The sensor 63b is formed by a carbon monoxide sensor formed of semiconductor. The sensor 63b is a sensor for detecting the unnecessary gas generated from the arc-extinguishing gas sprayed to the arc. The sensor 63b detects the concentration of carbon monoxide among the unnecessary gas generated from the arc-extinguishing gas sprayed to the arc. The sensor 63b is arranged near the air chamber 51b in the side opposite to ground plane of the sealed container 8. The output signal of the sensor 63b is input to external data logger (not illustrate in figures), etc.

3-2. Action

As described above, the arc-extinguishing gas sprayed to the arc generates the unnecessary gas including ozone and carbon monoxide. Since ozone has the specific gravity heavier than the arc-extinguishing gas, ozone is accumulated in the air chamber 51a in the ground plane side of the sealed container 8. Furthermore, since carbon monoxide has the specific gravity lighter than the arc-extinguishing gas, carbon monoxide is accumulated in the air chamber 51b in the ground plane side of the sealed container 8.

The accumulated amount of the accumulated ozone and carbon monoxide decreases as time elapses. However, if the breaking action of the gas circuit breaker is repeated before the time required for the accumulated amount to decrease is elapsed, ozone and carbon monoxide are accumulated cumulatively.

The worker monitors the concentration of ozone output from the sensor 63a and the concentration of carbon monoxide output from the sensor 63b by the external apparatuses such as data logger, etc.

By monitoring the concentration of ozone output from the sensor 63a and the concentration of carbon monoxide output from the sensor 63b, the worker can know the accumulated amount of ozone and carbon monoxide.

When the worker determines that the accumulated amount of ozone is equal to or more than certain amount, the worker opens the cock 64a and recovers ozone via the exhaust pipe 62a. When the worker determines that the accumulated amount of carbon monoxide is equal to or more than certain amount, the worker opens the cock 64b and recovers carbon monoxide via the exhaust pipe 62b.

3-3. Effect (1) According to the present embodiment, since the sensors 63a and 63b for detecting the unnecessary gas generated from the arc-extinguishing gas sprayed to the arc are provided, the worker can know the accumulated amount of ozone and carbon monoxide.

(2) According to the present embodiment, since the exhaust pipes 62a and 62b for exhausting the unnecessary gas generated from the arc-extinguishing gas sprayed to the arc are provided, the worker can recover ozone and carbon monoxide from the exhaust pipes 62a and 62b. As a result, ozone and carbon monoxide are removed from the interior of the sealed container 8, and the gas circuit breaker that can reduce the deterioration of insulation performance thereof and current breaking performance thereof by the unnecessary gas generated from the arc-extinguishing gas sprayed to the arc can be provided.

3-4. Modified Example (1) In the above embodiment, although the sensor 63a is the ozone sensor formed of semiconductor, the sensor 63 is not limited thereto. The sensor 63a may be UV absorption-type ozone sensor, etc. Furthermore, although the sensor 63a is arranged near the air chamber 51a of the sealed container 8, the installation location of the sensor 63a is not limited thereto. The sensor 63a may be arranged to the exhaust pipe 62a outside the sealed container 8.

(2) In the above embodiment, although the sensor 63b is the carbon monoxide sensor formed of semiconductor, the sensor 63 is not limited thereto. The sensor 63b may be IR absorption-type ozone sensor, etc. Furthermore, although the sensor 63b is arranged near the air chamber 51b of the sealed container 8, the installation location of the sensor 63b is not limited thereto. The sensor 63a may be arranged to the exhaust pipe 62b outside the sealed container 8.

(3) As an alternative to the above embodiment, the exhaust pipe 62a may be connected to and the sensor 63a may be arranged near the air chamber 51a in the first modified example illustrated in FIG. 3, the air chambers 54a and 55a in the second modified example illustrated in FIGS. 4 and 5, the air chamber 56a in the third modified example illustrated in FIG. 6, and the air chambers 57a and 58a in the fourth modified example illustrated in FIGS. 8 and 10. By such structure, the volume of the sealed container 8 can be reduced. As a result, compact gas circuit breaker that is easy to install in small installation location can be provided.

(4) As an alternative to the above embodiment, the exhaust pipe 62b may be connected to and the sensor 63b may be arranged near the air chamber 51b in the first modified example illustrated in FIG. 3, the air chambers 54b and 55b in the second modified example illustrated in FIGS. 4 and 5, the air chamber 56b in the third modified example illustrated in FIG. 6, and the air chambers 57b and 58b in the fourth modified example illustrated in FIGS. 8 and 10. By such structure, the volume of the sealed container 8 can be reduced. As a result, compact gas circuit breaker that is easy to install in small installation location can be provided.

Figure 14:
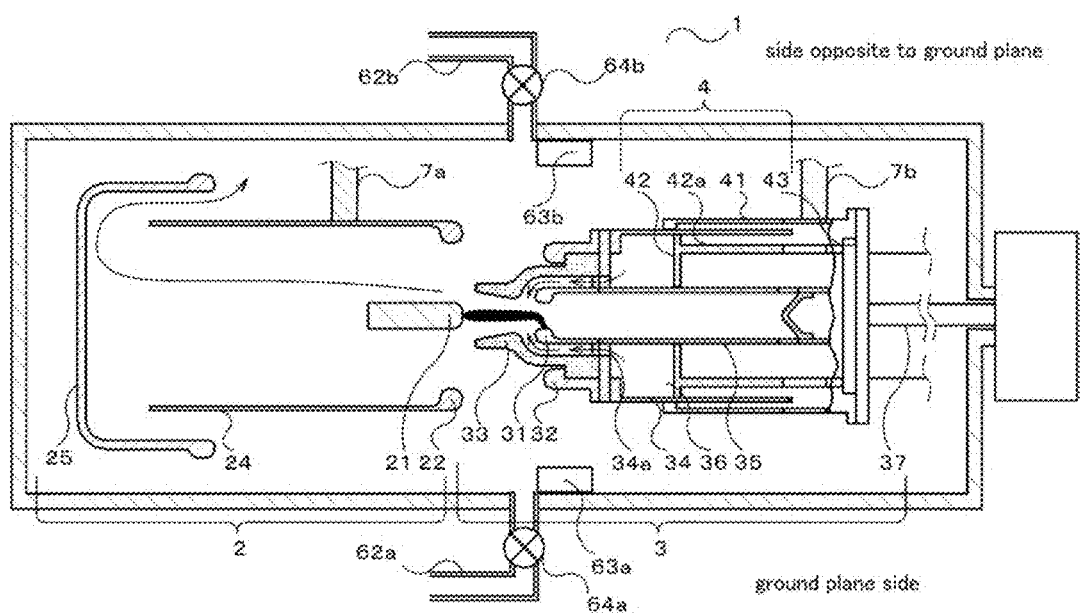
FIG. 14 is a diagram illustrating a structure of the gas circuit breaker according to a modified example of the third embodiment.

(5) In the above embodiment, although the exhaust pipe 62a is connected to the air chamber 51a, and the sensor 63a is arranged near the air chamber 51a, the installation location of the exhaust pipe 62a and the sensor 63a is not limited thereto. As illustrated in FIG. 14, the sealed container 8 may not include the air chamber 51a, the exhaust pipe 62a may be connected to the ground plane side of the sealed container 8, and the sensor 63a may be arranged inside the sealed container 8 at the ground plane side.

(6) In the above embodiment, although the exhaust pipe 62b is connected to the air chamber 51b, and the sensor 63b is arranged near the air chamber 51b, the installation location of the exhaust pipe 62b and the sensor 63b is not limited thereto. As illustrated in FIG. 14, the sealed container 8 may not include the air chamber 51b, the exhaust pipe 62b may be connected to the side opposite to ground plane of the sealed container 8, and the sensor 63b may be arranged inside the sealed container 8 at the side opposite to ground plane.

4. Fourth Embodiment

4-1. Structure

Figure 15:
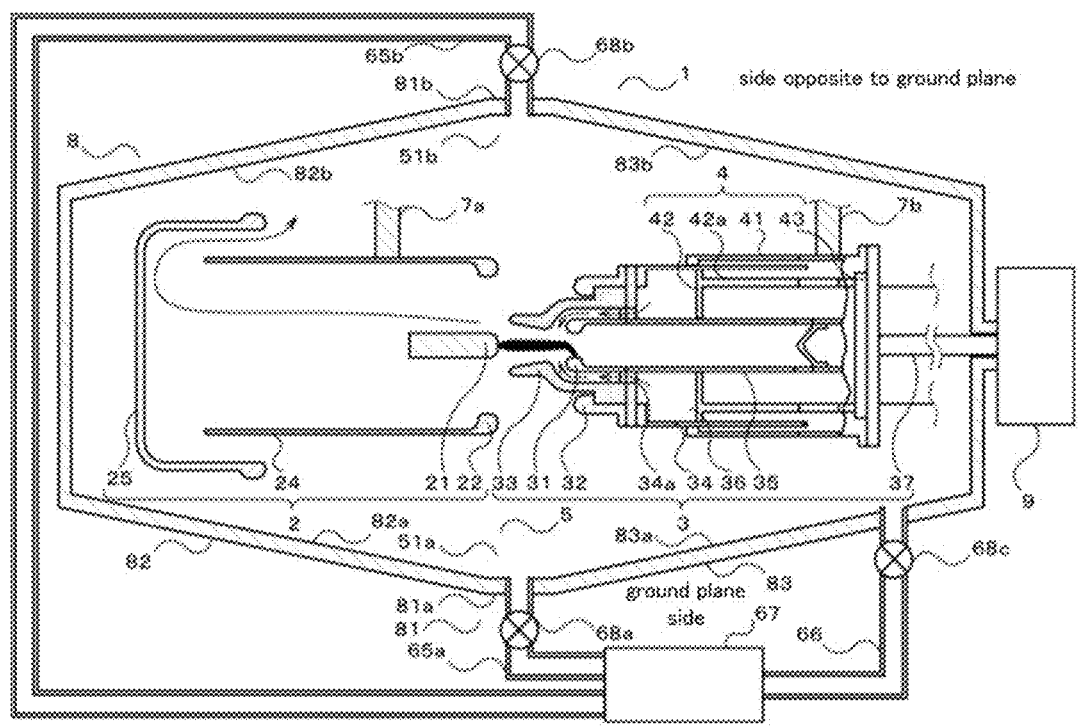
FIG. 15 is a diagram illustrating a structure of the gas circuit breaker according to the forth embodiment.

A gas circuit breaker according to a fourth embodiment is described with the reference to FIG. 15. Note that in the structure of the gas circuit breaker according to a second embodiment, the same parts as the first embodiment shown in FIGS. 1 to 11 are indicated by the same reference signs.

Although the gas circuit breaker 1 according to the first embodiment includes the air chambers 51a and 51b in the sealed container 8, the gas circuit breaker 1 according to the fourth embodiment is different in that a processing portion 67 for decomposing the unnecessary gas generated from the arc-extinguishing gas sprayed to the arc provided outside the sealed container 8, discharge pipes 65a and 65b for sending the arc-extinguishing gas including the unnecessary gas to the processing portion 67 from the sealed container 8, an air supplying pipe 66 for sending the arc-extinguishing gas which the unnecessary gas is decomposed in the processing portion 67 to the sealed container 8 are provided.

As illustrated in FIG. 15, the processing portion 67 is arranged outside the sealed container 8. The discharge pipes 65a and 65b for sending the arc-extinguishing gas to the processing portion 67, and an air supplying pipe 66 for sending the arc-extinguishing gas which the unnecessary gas is decomposed in the processing portion 67 to the sealed container 8 are connected.

The sealed container 8 has the cylindrical portion 81 at the joined portion of two hollow truncated cone portions 82 and 83, and the cylindrical portion 81 has the flat portion 81a at the ground plane side and the flat portion 81b at the side opposite to ground plane. As the first embodiment, the air chamber 51a for accumulating unnecessary gas with the specific gravity heavier than the arc-extinguishing gas, such as ozone, is arranged inside the flat portion 81a of the cylindrical portion 81 at the ground plane side. Furthermore, the air chamber 51b for accumulating unnecessary gas with the specific gravity lighter than the arc-extinguishing gas, such as carbon monoxide, is arranged inside the flat portion 81b of the cylindrical portion 81 at the side opposite to ground plane.

The discharge pipe 65a is connected to the air chamber 51a provided to the flat portion 81a of the cylindrical portion 81 at the ground plane side. The discharge pipe 65a forms a flow path in which the unnecessary gas is sent from the air chamber 51a to the processing portion 67 arranged outside the sealed container 8.

The discharge pipe 65a is formed by pipe formed of metal, such as aluminum, etc. The discharge pipe 65a is arranged to the air chamber 51a in the ground plane side of the sealed container 8. Furthermore, the discharge pipe 65a includes a cock 68a for opening and closing the discharge pipe 65a in the exterior of the sealed container 8 at midway to the processing portion 67.

The discharge pipe 65a sends the unnecessary gas with the specific gravity heavier than the arc-extinguishing gas, that is ozone, generated from the arc-extinguishing gas sprayed to the arc to the processing portion 67. The cock 68a is opened by the workers, and the unnecessary gas with the specific gravity heavier than the arc-extinguishing gas, that is ozone, generated from the arc-extinguishing gas sprayed to the arc is sent to the processing portion 67.

The discharge pipe 65b is connected to the air chamber 5ba provided to the flat portion 81a of the cylindrical portion 81 at the side opposite to ground plane. The discharge pipe 65b forms a flow path in which the unnecessary gas is sent from the air chamber 51b to the processing portion 67 arranged outside the sealed container 8.

The discharge pipe 65b is formed by pipe formed of metal, such as aluminum, etc. The discharge pipe 65b is arranged to the air chamber 51b in the side opposite to ground plane of the sealed container 8. Furthermore, the discharge pipe 65b includes a cock 68b for opening and closing the discharge pipe 65b in the exterior of the sealed container 8 at midway to the processing portion 67.

The discharge pipe 65b sends the unnecessary gas with the specific gravity lighter than the arc-extinguishing gas, that is carbon monoxide, generated from the arc-extinguishing gas sprayed to the arc to the processing portion 67. The cock 68b is opened by the workers, and the unnecessary gas with the specific gravity lighter than the arc-extinguishing gas, that is carbon monoxide, generated from the arc-extinguishing gas sprayed to the arc is sent to the processing portion 67.

The air supplying pipe 66 is formed by pipe formed of metal, such as aluminum, etc. One end of the air supplying pipe 66 is connected to the sealed container 8, and the other end of the air supplying pipe 66 is connected to the processing portion 67. Furthermore, the air supplying pipe 66 includes a cock 68c for opening and closing the air supplying pipe 66 at midway from the processing portion 67 to the sealed container 8 outside the sealed container 8. The air supplying pipe 66 is preferably connected to the sealed container 8 in the driving-device direction side.

The air supplying pipe 66 sends the arc-extinguishing gas which the unnecessary gas is removed to the sealed container 8.

The processing portion 67 is formed the ozone decomposition catalyst placed inside the casing formed of metal, such as aluminum casing, etc. The processing portion 67 is arranged outside the sealed container 8. An input side of the processing portion 67 is connected to the sealed container 8 via the exhaust pipes 65a and 65b. The output side of the processing portion 67 is connected to the sealed container 8 via the air supplying pipe 66.

The arc-extinguishing gas including the unnecessary gas, that is ozone, is sent to the processing portion 67 via the air chamber 51a and the discharge pipe 65a provided to the ground plane side of the sealed container 8 by a blower (not illustrated in figure) provided in the processing portion 67. Furthermore, the arc-extinguishing gas including the unnecessary gas, that is carbon monoxide, is sent to the processing portion 67 via the air chamber 51b and the discharge pipe 65b provided to the side opposite to ground plane of the sealed container 8.

Activated carbon is used as the ozone decomposition catalyst of the processing portion 67. The processing portion 67 mixes the unnecessary gas included in the arc-extinguishing gas sprayed to the arc, that is ozone and carbon monoxide, and decomposes them by causing the above reactions 10, 11, and 12. The arc-extinguishing gas including the unnecessary gas discharged from the sealed container 8 via the discharge pipes 65a and 65b is sent to the sealed container 8 after ozone and carbon monoxide are decomposed.

4-2. Action

As described above, the arc-extinguishing gas sprayed to the arc generates the unnecessary gas including ozone and carbon monoxide. Since ozone has the specific gravity heavier than the arc-extinguishing gas, ozone is accumulated in the air chamber 51a in the ground plane side of the sealed container 8. Furthermore, since carbon monoxide has the specific gravity lighter than the arc-extinguishing gas, carbon monoxide is accumulated in the air chamber 51b in the side opposite to ground plane of the sealed container 8.

The discharge pipe 65a is arranged to the air chamber 51a at the ground plane side. When the cock 68a and the cock 68c are opened by the worker the arc-extinguishing gas including ozone accumulated in the ground plane side of the sealed container 8 is sent to the processing portion 67 via the discharge pipe 65a by the blower (not illustrated in figure) provided in the processing portion 67.

The discharge pipe 65b is arranged to the air chamber 51b at the side opposite to ground plane. When the cock 68b and the cock 68c are opened by the worker the arc-extinguishing gas including carbon monoxide accumulated in the side opposite to ground plane of the sealed container 8 is sent to the processing portion 67 via the discharge pipe 65b by the blower (not illustrated in figure) provided in the processing portion 67.

The processing portion 67 has the ozone decomposition catalyst, that is activated carbon, in the casing formed of metal, such as aluminum casing. The processing portion 67 sucks the arc-extinguishing gas including the unnecessary gas that is ozone via the air chamber 51a and discharge pipe 56a arranged to the ground plane side of the sealed container 8, and sucks the arc-extinguishing gas including the unnecessary gas that is carbon monoxide via the air chamber 51b and discharge pipe 56b arranged to the side opposite to ground plane of the sealed container 8.

The processing portion mixes ozone sucked via the discharge pipe 65a and carbon monoxide sucked via the discharge pipe 65b, and decomposes them by causing the above reactions 10, 11, and 12. The processing portion 67 send the arc-extinguishing gas to the sealed container 8 via the air supplying pipe 66 after decomposing ozone sucked via the discharge pipe 65a and carbon monoxide sucked via the discharge pipe 65b.

4-3. Effect (1) According to the present embodiment, since the processing portion 67 for decomposing the unnecessary gas generated from the arc-extinguishing gas sprayed to the arc provided outside the sealed container 8, the discharge pipes 65a and 65b for sending the arc-extinguishing gas including the unnecessary gas to the processing portion 67 from the sealed container 8, the air supplying pipe 66 for sending the arc-extinguishing gas which the unnecessary gas is decomposed in the processing portion 67 to the sealed container 8 are provided, the gas circuit breaker that can reduce the deterioration of insulation performance thereof and current breaking performance thereof by the unnecessary gas generated from the arc-extinguishing gas sprayed to the arc can be provided.

(2) According to the present embodiment, since the discharge pipe 65a is arranged to the ground plane side of the sealed container 8 and discharges the unnecessary gas with the specific gravity heavier than the arc-extinguishing gas, that is ozone, generated from the arc-extinguishing gas, the discharge pipe 65b is arranged to the side opposite to ground plane of the sealed container 8 and discharges the unnecessary gas with the specific gravity lighter than the arc-extinguishing gas, that is carbon monoxide, generated from the arc-extinguishing gas, and the processing portion 67 mixes and decomposes ozone sucked via the discharge pipe 65a and carbon monoxide sucked via the discharge pipe 65b, the gas circuit breaker that can reduce the deterioration of insulation performance thereof and current breaking performance thereof by the unnecessary gas can be provided.

(3) According to the present embodiment, since the arc-extinguishing gas including the unnecessary gas that is ozone and carbon monoxide is sent to the sealed container 8 via the air supplying pipe 66 by the processing portion 67 after ozone and carbon monoxide are decomposed, reduction of pressure of the arc-extinguishing in the sealed container 8 can be avoided. Furthermore, the dispersion of the unnecessary gas that is ozone and carbon monoxide can be prevented.

4-4. Modified Example (1) In the above embodiment, although the discharge pipe 65a for sending the arc-extinguishing gas including ozone to the processing portion 67 and the discharge pipe 65b for sending the arc-extinguishing gas including carbon monoxide to the processing portion 67 are both provided, either one of the discharge pipe 65a for sending the arc-extinguishing gas including ozone to the processing portion 67 and the discharge pipe 65b for sending the arc-extinguishing gas including carbon monoxide to the processing portion 67 may be provided. The processing portion 67 may adsorb either one of ozone and carbon monoxide as the unnecessary gas.

Figure 16:
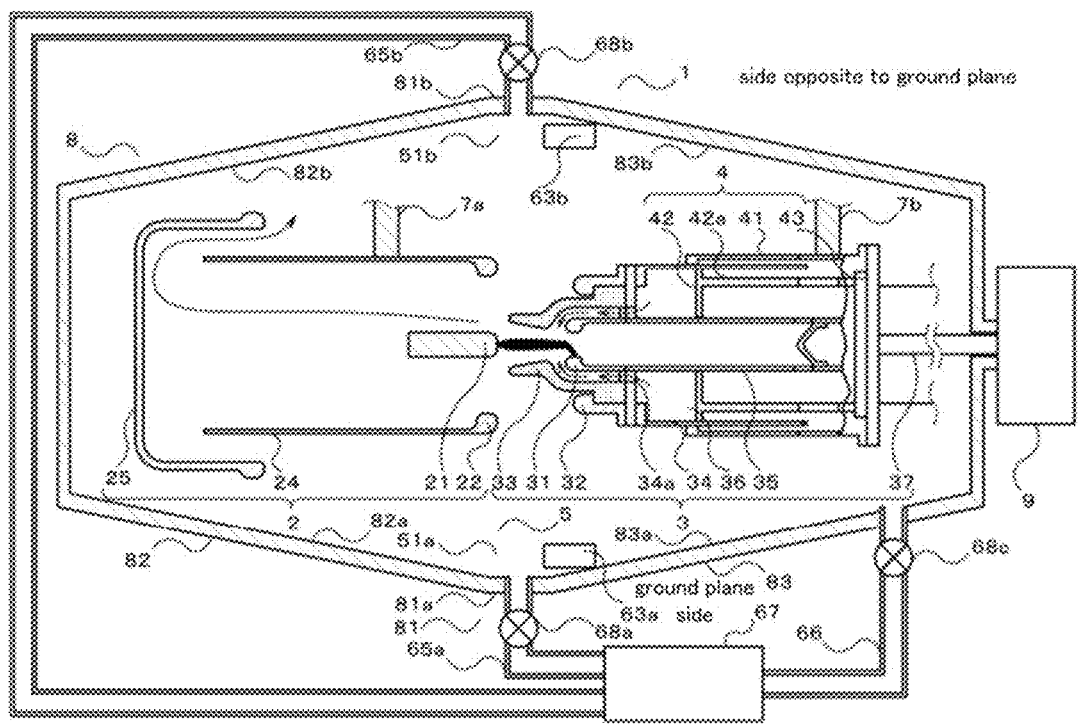
FIG. 16 is a diagram illustrating a structure of the gas circuit breaker having a sensor according to a modified example of the third embodiment.

(2) In addition to the above embodiment, as illustrated in FIG. 16, the sensor 63a may be provided in the ground plane side of the sealed container 8. The sensor 63a is formed by an ozone sensor formed of semiconductor. The sensor 63a is a sensor for detecting the unnecessary gas generated from the arc-extinguishing gas sprayed to the arc. The sensor 63a detects the concentration of ozone among the unnecessary gas generated from the arc-extinguishing gas sprayed to the arc. The sensor 63a is arranged near the air chamber 51a in the ground plane side of the sealed container 8. The output signal of the sensor 63a is input to external data logger (not illustrate in figures), etc.

By monitoring the concentration of ozone output from the sensor 63a, the worker can know the accumulated amount of ozone. When the concentration of ozone exceeds predefined concentration, the worker can open the cocks 68a and 68c to operate processing portion 67 to process ozone.

In addition to the above embodiment, as illustrated in FIG. 16, the sensor 63b may be provided at the side opposite to ground plane of the sealed container 8. The sensor 63b is formed by a carbon monoxide sensor formed of semiconductor. The sensor 63b is a sensor for detecting the unnecessary gas generated from the arc-extinguishing gas sprayed to the arc. The sensor 63b detects the concentration of carbon monoxide among the unnecessary gas generated from the arc-extinguishing gas sprayed to the arc. The sensor 63b is arranged near the air chamber 51b in the side opposite to ground plane of the sealed container 8. The output signal of the sensor 63b is input to external data logger (not illustrate in figures), etc.

By monitoring the concentration of carbon monoxide output from the sensor 63b, the worker can know the accumulated amount of carbon monoxide. When the concentration of carbon monoxide exceeds predefined concentration, the worker can open the cocks 68b and 68c to operate processing portion 67 to process carbon monoxide.

(4) In the above embodiment, one end of the discharge pipe 65a is connected to the sealed container 8, and the other end of the discharge pipe 65a is connected to the processing portion 67. Similarly, one end of the discharge pipe 65b is connected to the sealed container 8, and the other end of the discharge pipe 65b is connected to the processing portion 67.

Figure 17:
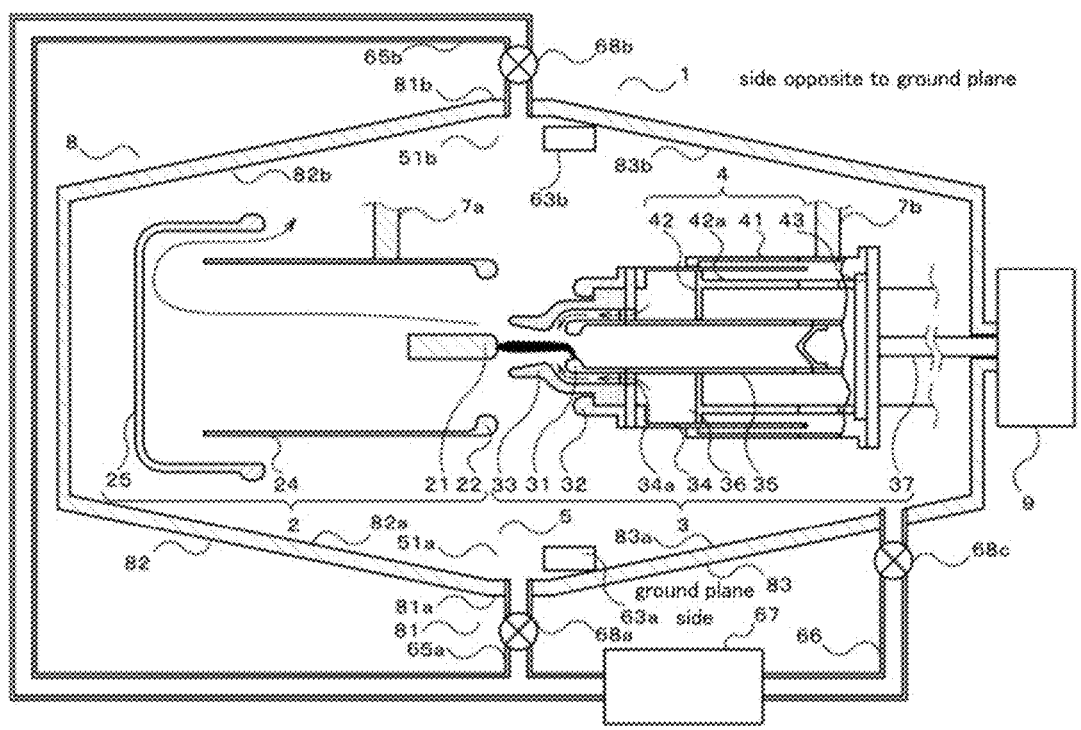
FIG. 17 is a diagram illustrating an exhaust cylinder of the gas circuit breaker according to a modified example of the forth embodiment.

However, the discharge pipe 65a and the discharge pipe 65b may be manifolded and integrated, and connected to the processing portion 67 as illustrated in FIG. 17. By such structure, ozone and carbon monoxide are mixed and the decomposition of the unnecessary gas can be efficiently performed.

(5) As an alternative to the above embodiment, the discharge pipe 65a may be connected to the air chamber 51a in the first modified example illustrated in FIG. 3, the air chambers 54a and 55a in the second modified example illustrated in FIGS. 4 and 5, the air chamber 56a in the third modified example illustrated in FIG. 6, and the air chambers 57a and 58a in the fourth modified example illustrated in FIGS. 8 and 10. By such structure, the volume of the sealed container 8 can be reduced. As a result, compact gas circuit breaker that is easy to install in small installation location can be provided.

(6) As an alternative to the above embodiment, the discharge pipe 62a may be connected to the air chamber 51b in the first modified example illustrated in FIG. 3, the air chambers 54b and 55b in the second modified example illustrated in FIGS. 4 and 5, the air chamber 56b in the third modified example illustrated in FIG. 6, and the air chambers 57b and 58b in the fourth modified example illustrated in FIGS. 8 and 10. By such structure, the volume of the sealed container 8 can be reduced. As a result, compact gas circuit breaker that is easy to install in small installation location can be provided.

Figure 18:
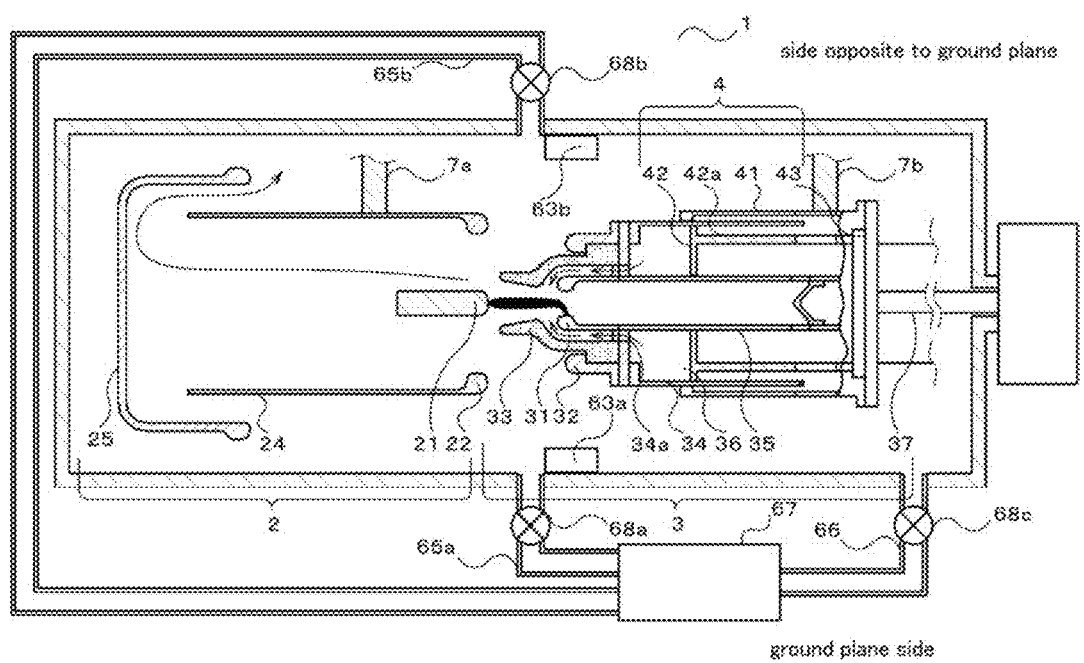
FIG. 18 is a diagram illustrating the gas circuit breaker according to another form of a modified example of the forth embodiment.

(7) In the above embodiment, although the discharge pipe 65a is connected to the air chamber 51a, the installation location of the discharge pipe 65a is not limited thereto. As illustrated in FIG. 18, the sealed container 8 may not include the air chamber 51a, and the discharge pipe 65a may be connected to the ground plane side of the sealed container 8.

(8) In the above embodiment, although the discharge pipe 65b is connected to the air chamber 51b, the installation location of the discharge pipe 65b is not limited thereto. As illustrated in FIG. 18, the sealed container 8 may not include the air chamber 51b, and the discharge pipe 65b may be connected to the side opposite to ground plane of the sealed container 8.

5. Other Embodiment

Although embodiments including the modified examples are described, these embodiments are merely provided as examples, and are not intended to limit the scope of the claims. These embodiments can be implemented in other various forms, and various omissions, replacements, and modifications can be made thereto without departing from the scope of the invention. These embodiments and modifications are included in the claims of the invention and equivalents thereto, similarly to the scope and abstract of the invention. One example are described below.

(1) In the above embodiment, although the arc-extinguishing gas mainly composed of carbon dioxide ($CO_2$ gas), the arc-extinguishing gas is not limited thereto. The arc-extinguishing gas may be gas composed of other composition that generates the unnecessary gas.

REFERENCE SIGNS

1: gas circuit breaker
2, 4: fixed contactor portion
3: movable contactor portion
5, 51a, 51b, 54a, 54b, 55a, 55b, 56a, 56b, 57a, 57b, 58a, 58b: air chamber
7a, 7b: power supply line
8: sealed container
9: driving device
21: fixed arc contactor
22: fixed conductive contactor
24: ventilation cylinder
25: exhaust pipe
31: movable arc contactor
32: movable conductive contactor
33: insulation nozzle
34: cylinder
34a: through hole
35: operation rod
36: accumulation chamber
37: insulation rod
41: conductive contactor
42: piston
42a: piston support
43: support
61a, 61b: ozone decomposition catalyst
62a, 62b: exhaust pipe
63a, 63b: sensor
64a, 64b: cock
65a, 65b: discharge pipe
66: air supplying pipe
67: processing portion
68a, 68b, 68c: cock
81: cylindrical portion
81a, 81b: flat portion
82, 83: truncated cone portion
82a, 82b, 83a, 83b, 84a, 84b, 85a, 85b: tapered portion
86: cylindrical portion

The invention claimed is:

1. A gas circuit breaker comprising:
a sealed container which arc-extinguishing gas is filled therein;
a first fixed contactor portion which is fixed to the sealed container;
a second fixed contactor portion which is fixed to the sealed container; and
a movable contactor portion which moves between the first fixed contactor portion and the second fixed contactor portion, and which conducts and breaks current between the first fixed contactor portion and the second fixed contactor portion,
wherein:
an arc generated between a fixed arc contactor provided to the first fixed contact or portion and a movable arc contactor provided to the movable contactor portion at a time of current breaking action is extinguished by the arc-extinguishing gas being sprayed thereto,
the sealed container comprises an air chamber therein to accumulate unnecessary gas generated from the arc-extinguishing gas sprayed to the arc,
the sealed container is in a shape in which ends of two truncated cone portions with large diameters are joined, and
the air chamber is formed in a portion where the two truncated cone portions forming the sealed containers are joined.

2. The gas circuit breaker according to claim 1, wherein the air chamber is formed by an air chamber which accumulates the unnecessary gas with specific gravity heavier than the arc-extinguishing gas, and which is arranged in a ground plane side of the sealed container.

3. The gas circuit breaker according to claim 1, wherein the air chamber is formed by an air chamber which accumulates the unnecessary gas with specific gravity lighter than the arc-extinguishing gas, and which is arranged in a side opposite to ground plane of the sealed container.

4. The gas circuit breaker according to claim 1, wherein a catalyst which decomposes the unnecessary gas is placed in the air chamber.

5. The gas circuit breaker according to claim 4, wherein the catalyst includes at least one of manganese, aluminum, cerium, barium, platinum, palladium, rhodium, and ruthenium.

6. The gas circuit breaker according to claim 1, wherein an adsorbent which adsorbs the unnecessary gas is placed in the air chamber.

7. The gas circuit breaker according to claim 6, wherein the adsorbent is an activated carbon.

8. The gas circuit breaker according to claim 1, wherein:
the air chamber is formed by a first air chamber which accumulates the unnecessary gas with specific gravity heavier than the arc-extinguishing gas and which is arranged in a ground plane side of the sealed container, and a second air chamber which accumulates the unnecessary gas with specific gravity lighter than the arc-extinguishing gas, and which is arranged in a side opposite to ground plane of the sealed container, and
the gas circuit breaker comprises:
a processing portion which is arranged outside the sealed container, and which decomposes the unnecessary gas generated from the arc-extinguishing gas sprayed to the arc;
a first discharge pipe which sends the unnecessary gas from the first air chamber to the processing portion;
a second discharge pipe which sends the unnecessary gas from the second air chamber to the processing portion; and
an air supplying pipe which sends the arc-extinguishing gas which the unnecessary gas is decomposed to the sealed container.

9. The gas circuit breaker according to claim 1, comprising at least one of:
an exhaust pipe which exhausts ozone with specific gravity heavier than the arc-extinguishing gas among the unnecessary gas generated from the arc-extinguishing gas and which is arranged in a ground plane side of the sealed container, and
an exhaust pipe which exhausts carbon monoxide with specific gravity lighter than the arc-extinguishing gas among the unnecessary gas generated from the arc-extinguishing gas and which is arranged in a side opposite to ground plane of the sealed container.

10. The gas circuit breaker according to claim 1, comprising a sensor which detects the unnecessary gas generated from the arc-extinguishing gas sprayed to the arc.

11. The gas circuit breaker according to claim 10, wherein the sensor is at least one of an ozone sensor which detects ozone with specific gravity heavier than the arc-extinguishing gas among the unnecessary gas generated from the arc-extinguishing gas and which is arranged in a ground plane side of the sealed container, and a carbon monoxide sensor which detects carbon monoxide with specific gravity lighter than the arc-extinguishing gas among the unnecessary gas generated from the arc-extinguishing gas and which is arranged in a side opposite to ground plane of the sealed container.

12. The gas circuit breaker according to claim 1, wherein the arc-extinguishing gas is equal to or more than 1 MPa-g, and includes equal to or more than 50% of carbon dioxide.

13. A gas circuit breaker comprising:
a sealed container which arc-extinguishing gas is filled therein;
a first fixed contactor portion which is fixed to the sealed container;
a second fixed contactor portion which is fixed to the sealed container; and
a movable contactor portion which moves between the first fixed contactor portion and the second fixed contactor portion, and which conducts and breaks current between the first fixed contactor portion and the second fixed contactor portion,
wherein:
an arc generated between a fixed arc contactor provided to the first fixed contactor portion and a movable arc contactor provided to the movable contactor portion at a time of current breaking action is extinguished by the arc-extinguishing gas being sprayed thereto,
the sealed container comprises an air chamber therein to accumulate unnecessary gas generated from the arc-extinguishing gas sprayed to the arc,
the sealed container is in a truncated cone shape, and
the air chamber is formed at an end of the truncated cone shape with a large diameter forming the sealed container.

14. The gas circuit breaker according to claim 13, wherein the air chamber is formed by an air chamber which accumulates the unnecessary gas with specific gravity heavier than the arc-extinguishing gas, and which is arranged in a ground plane side of the sealed container.

15. The gas circuit breaker according to claim 13, wherein the air chamber is formed by an air chamber which accumulates the unnecessary gas with specific gravity lighter than the arc-extinguishing gas, and which is arranged in a side opposite to ground plane of the sealed container.

16. The gas circuit breaker according to claim 13, wherein a catalyst which decomposes the unnecessary gas is placed in the air chamber.

17. A gas circuit breaker comprising:
a sealed container which arc-extinguishing gas is filled therein;
a first fixed contactor portion which is fixed to the sealed container;
a second fixed contactor portion which is fixed to the sealed container; and
a movable contactor portion which moves between the first fixed contactor portion and the second fixed contactor portion, and which conducts and breaks current between the first fixed contactor portion and the second fixed contactor portion,
wherein:
an arc generated between a fixed arc contactor provided to the first fixed contactor portion and a movable arc contactor provided to the movable contactor portion at a time of current breaking action is extinguished by the arc-extinguishing gas being sprayed thereto,
the sealed container comprises an air chamber therein to accumulate unnecessary gas generated from the arc-extinguishing gas sprayed to the arc,
the sealed container is in a cylindrical shape, and
the air chamber is arranged in a cylindrical circumference of the sealed container and has a cylindrical portion having an inner diameter larger than an inner diameter of the sealed container.

18. The gas circuit breaker according to claim 17, wherein the air chamber is formed by an air chamber which accumulates the unnecessary gas with specific gravity heavier than the arc-extinguishing gas, and which is arranged in a ground plane side of the sealed container.

19. The gas circuit breaker according to claim 17, wherein the air chamber is formed by an air chamber which accumulates the unnecessary gas with specific gravity lighter than the arc-extinguishing gas, and which is arranged in a side opposite to ground plane of the sealed container.

20. The gas circuit breaker according to claim 17, wherein a catalyst which decomposes the unnecessary gas is placed in the air chamber.

* * * * *

UNITED STATES PATENT AND TRADEMARK OFFICE
CERTIFICATE OF CORRECTION

| | | |
|---|---|---|
| PATENT NO. | : 11,177,097 B2 | Page 1 of 1 |
| APPLICATION NO. | : 16/768648 | |
| DATED | : November 16, 2021 | |
| INVENTOR(S) | : Iijima et al. | |

It is certified that error appears in the above-identified patent and that said Letters Patent is hereby corrected as shown below:

In the Claims

In Claim 1, Column 36, Lines 59-60, "sealed containers" should read --sealed container--.

Signed and Sealed this
Twenty-ninth Day of March, 2022

Drew Hirshfeld
*Performing the Functions and Duties of the*
*Under Secretary of Commerce for Intellectual Property and*
*Director of the United States Patent and Trademark Office*